(12) United States Patent
Aoshima

(10) Patent No.: US 6,559,569 B2
(45) Date of Patent: May 6, 2003

(54) MOTOR DEVICE

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,584

(22) Filed: Apr. 17, 2001

(65) Prior Publication Data
US 2002/0047415 A1 Apr. 25, 2002

(30) Foreign Application Priority Data

Apr. 18, 2000 (JP) ........................................ 2000-116078
Apr. 18, 2000 (JP) ........................................ 2000-116079

(51) Int. Cl.[7] .......................... H02K 17/00; H02K 37/00
(52) U.S. Cl. ........................ 310/112; 310/49 R; 310/99; 310/114
(58) Field of Search ........................ 310/40 MM, 49 R, 310/75 R, 80, 83, 96, 99, 112, 114; 29/596–598

(56) References Cited

U.S. PATENT DOCUMENTS

| | | | |
|---|---|---|---|
| 3,757,149 A | * | 9/1973 | Holper ........................ 310/114 |
| 4,169,983 A | * | 10/1979 | Felder ........................ 310/114 |
| 5,384,506 A | | 1/1995 | Aoshima ................... 310/49 R |
| 5,831,356 A | | 11/1998 | Aoshima ................... 310/49 R |
| 5,925,945 A | | 7/1999 | Aoshima ................... 310/49 R |
| 5,945,753 A | | 8/1999 | Maegawa et al. .......... 310/68 R |
| 5,969,453 A | | 10/1999 | Aoshima ..................... 310/156 |
| 5,973,425 A | | 10/1999 | Aoshima ................... 310/49 R |
| 6,046,517 A | | 4/2000 | Sasaki et al. ................ 310/257 |
| 6,081,053 A | | 6/2000 | Maegawa et al. ......... 310/49 R |
| 6,157,107 A | * | 12/2000 | Aoshima et al. ............ 310/156 |
| 6,172,440 B1 | | 1/2001 | Sasaki et al. ............... 310/156 |
| 6,198,182 B1 | * | 3/2001 | Bustamante et al. ...... 310/49 R |

FOREIGN PATENT DOCUMENTS

JP 9-331666 12/1997

* cited by examiner

Primary Examiner—Tran Nguyen
(74) Attorney, Agent, or Firm—Fitzpatrick, Cella, Harper & Scinto

(57) ABSTRACT

A motor device including a pair of motor units and a driven member meshed with rotary gears of the pair of motor units to drive the driven member, the motor units each including a rotary magnet that is cylindrical and magnetized so as to have different magnetic poles in turn along the circumferential direction, a rotary gear having a plurality of teeth, the rotary gear rotating about the rotation axis of the rotary magnet together with the rotary magnet, and a stator member having a plurality of outer magnetic poles that are arranged on the outer periphery of the rotary magnet and a plurality of inner magnetic poles that are arranged on the inner periphery of the rotary magnet and are opposed to the outer magnetic poles, the plural outer magnetic poles and the plural inner magnetic poles being excited by a coil.

12 Claims, 13 Drawing Sheets

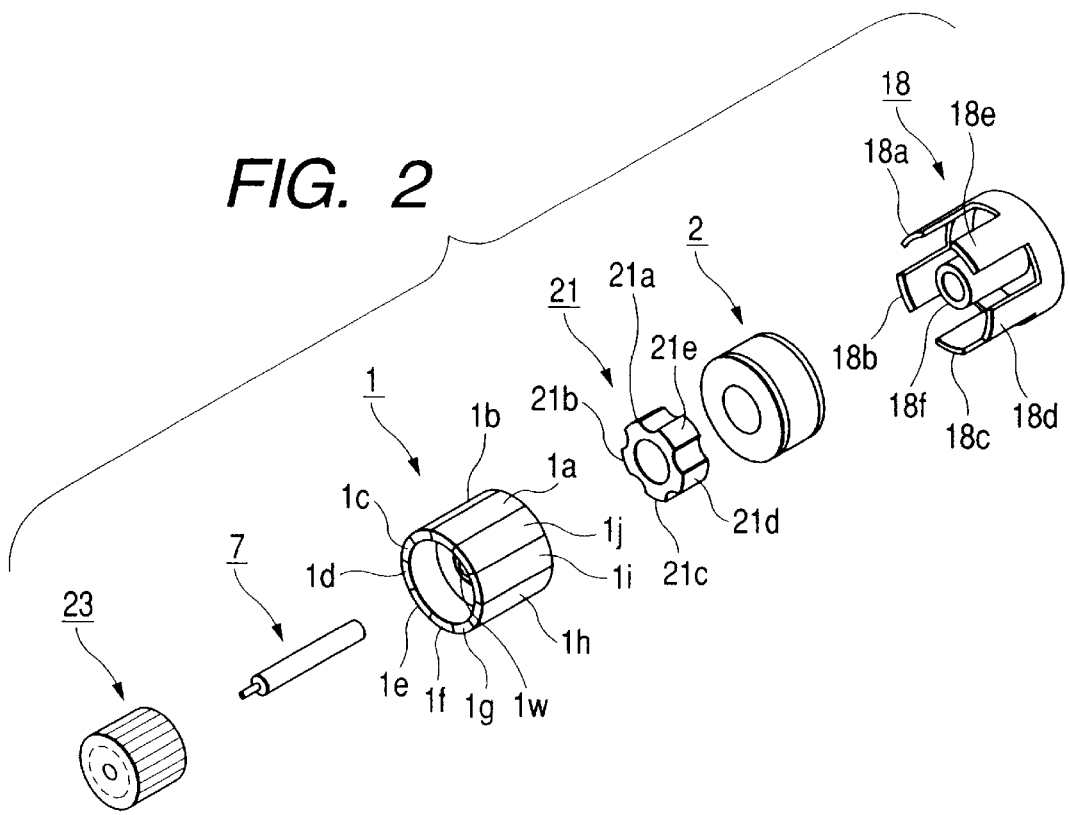
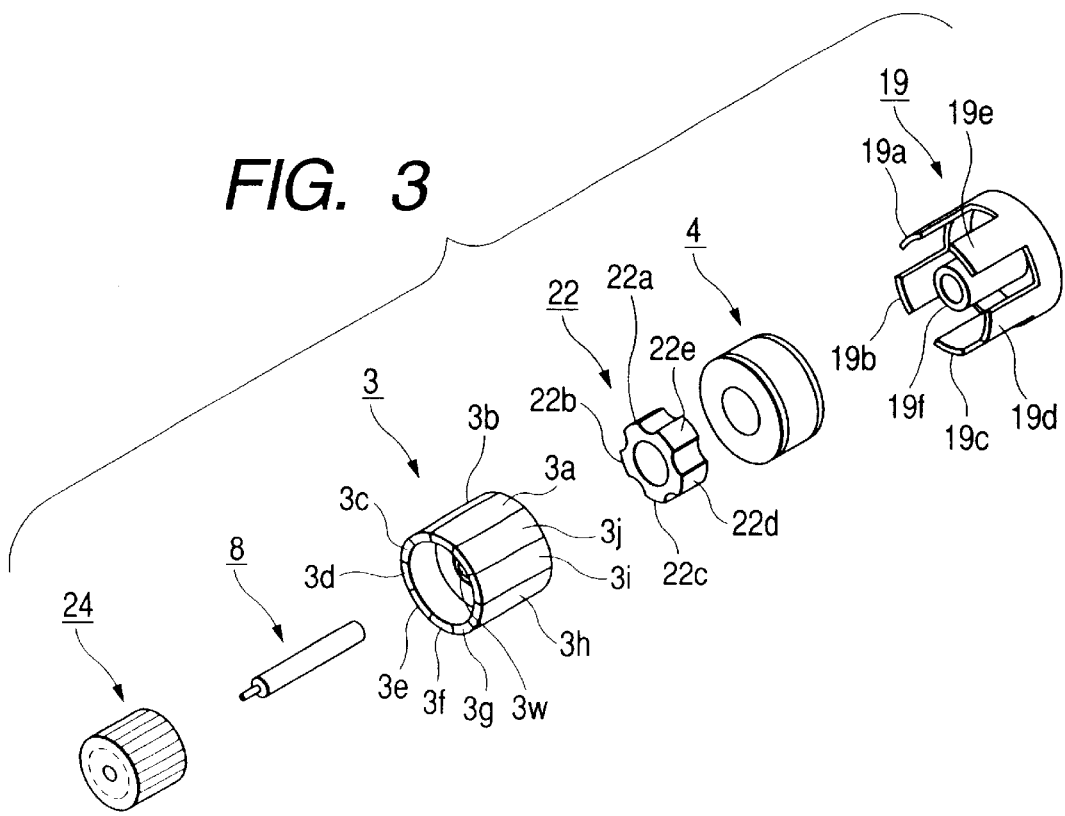

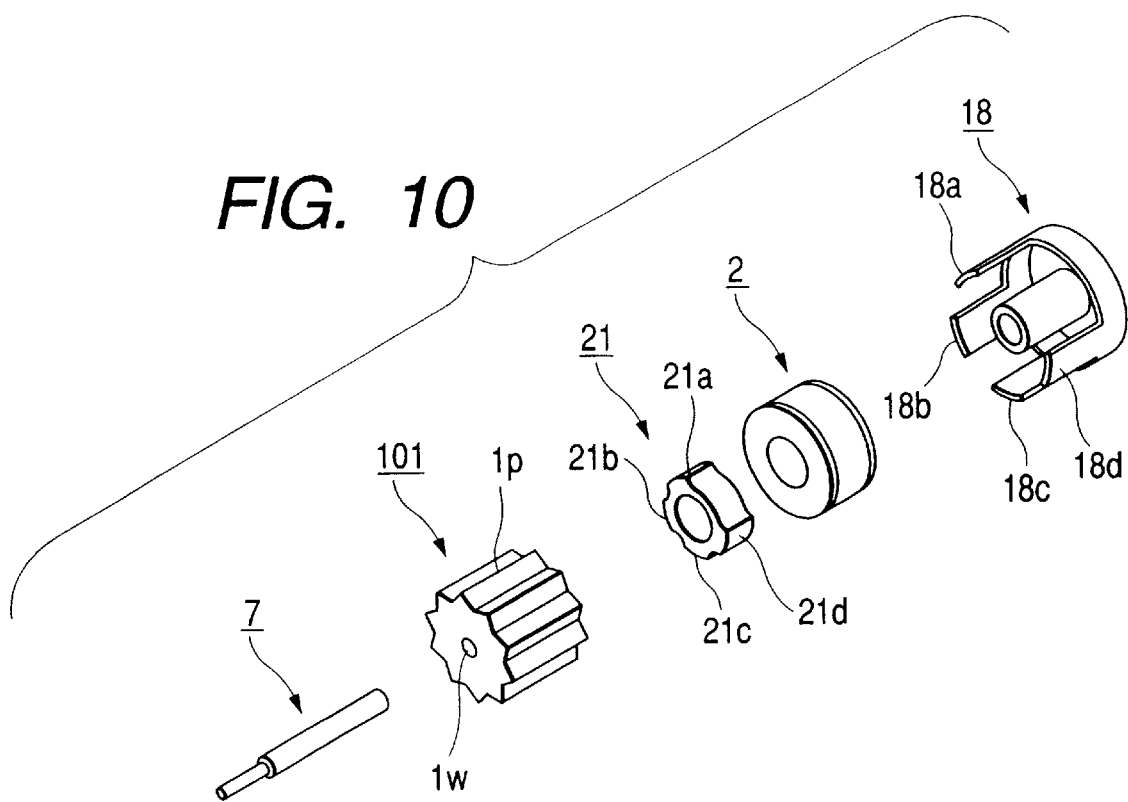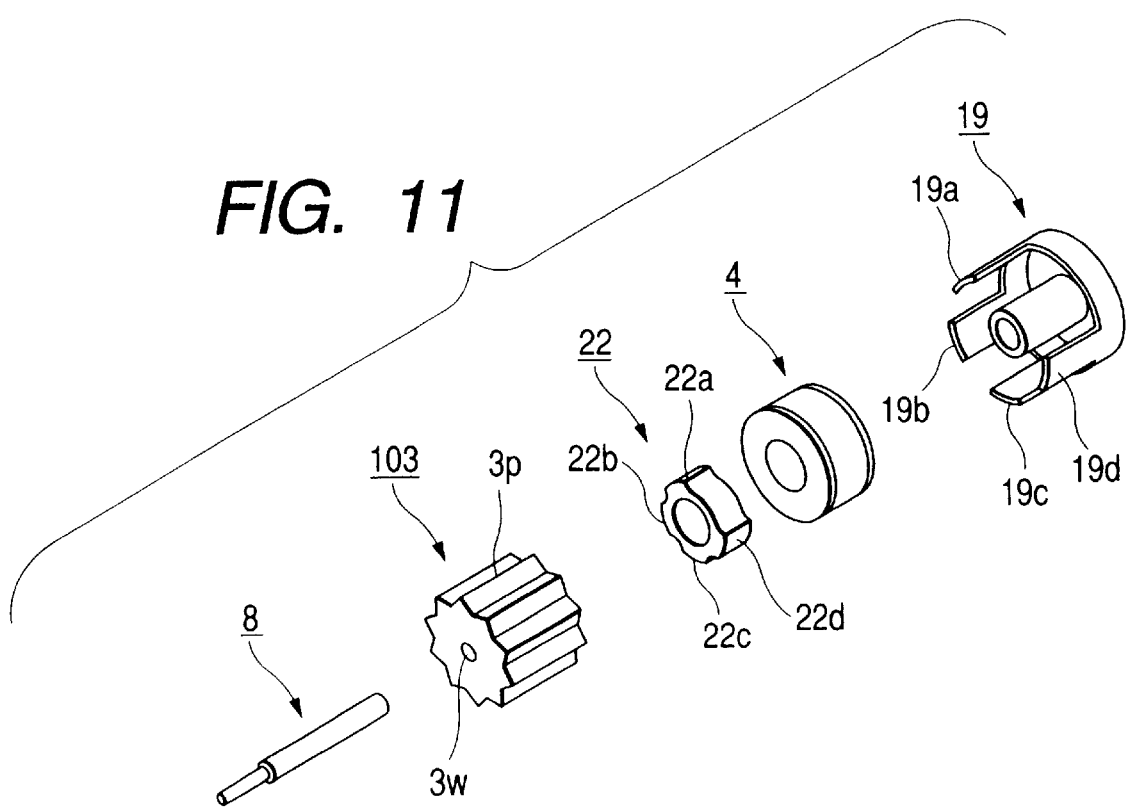

MOTOR DEVICE

BACKGROUND OF THE INVENTION

1. Field of the Invention

The present invention relates to a driving device composed of an ultra-small motor, and particularly to an aperture blade driving device using the same.

2. Related Backgroud Art

FIG. 18 shows one of small-sized cylindrical step motor in the prior art. A stator coil 105 is wound around a bobbin 101 concentrically. The bobbin 101 is fixed by being axially held and fixed by two stator yokes 106 and 106. Each stator yoke 106 has stator teeth 106a and 106b that are alternately placed on the inner circumferential surface and in the circumferential direction of the bobbin 101. The stator yoke 106 integrated with the stator teeth 106a or 106b is fixed to case 103 thereby comprising a stator 102.

Of two cases 103 and 103, one case 103 has a flange 115 and a bearing 108 that are fixed thereto whereas the other case 103 has another bearing 108 fixed thereto. A rotor 109 is composed of a rotor magnet 111 fixed to a rotor shaft 110. A radial void is formed between the rotor magnet 111 and the stator teeth 106a of stator 102. The rotor shaft 110 is rotatably supported between the two bearings 108 and 108.

FIG. 20 shows a step motor that is one of those driven by a single coil and is frequently used in watches. Denoted by 201 is a rotor composed of a permanent magnet, and 202 and 203 denotes stators while 204 denotes a coil.

The conventional small-sized step motor shown in FIG. 18 has a drawback that the external dimension of the motor is large because the case 103, the bobbin 101, the stator coil 105 and the stator yoke 106 are arranged concentrically about the outer periphery of the rotor. This step motor has another drawback of low output, for, as shown in FIG. 19, the flux of magnetic force generated upon energization of the stator coil 105 mainly passes between an end face 106a1 of the stator tooth 106a and an end face 106b1 of the stator tooth 106b and does not act on the rotor magnet 111 effectively.

The step motor shown in FIG. 20 is also ineffective in making the flux of magnetic force that is generated upon energization of the coil act on the magnet because the flux of magnetic force concentrates on a small gap between the stator 202 and the stator 203. The inventors of the present invention have proposed a motor to solve these problems in Japanese Patent Application Laid-Open No. 9-331666 (U.S. Pat. No. 5,831,356).

The motor proposed has a rotor formed into a cylinder and composed of a permanent magnet that is divided into equal parts along the circumferential direction and is magnetized so as to form different poles alternately. In the axial direction of the rotor, a first coil, the rotor and a second coil are arranged in this order. The first coil excites a first outer magnetic pole that faces the outer peripheral surface of the rotor as well as a first inner magnetic pole that faces the inner peripheral surface of the rotor. The second coil excites a second outer magnetic pole that faces the outer peripheral surface of the rotor as well as a second inner magnetic pole that faces the inner peripheral surface of the rotor. The rotation axis that is the rotor shaft is taken out the interior of the cylindrical permanent magnet.

The motor structured as above has a high output and a small motor external dimension, but there is room to improve it in facilitating joining of the rotor shaft to the permanent magnet. If a thin magnet is used in the structure above, the distance between the first outer magnetic pole and the first inner magnetic pole as well as the distance between the second outer magnetic pole and the second inner magnetic pole can be closed, resulting in a reduction in magnetic resistance in the magnetic circuit. This makes it possible to generate more flux of magnetic force with a small amount of current flowing through the first coil and the second coil.

However, the motor disclosed in Japanese Patent Application Laid-Open No. 9-331666 and other motors of that type are required to be long to a certain degree in the axial direction. For that reason, there has lately been a demand for a drive transmission device composed of a ultra-small motor whose axial length is very short. The drive transmission device composed of a ultra-small motor whose axial length is very short is particularly needed as a drive transmission device used in a lens barrel of a camera in order to drive an aperture blade, a shutter, a lens, etc.

SUMMARY OF THE INVENTION

A first object of the present invention is to provide a drive transmission device composed of an ultra-small motor that is easy to assemble and has high output.

A second object of the present invention is to provide a drive transmission device composed of an ultra-small motor whose axial length is very short.

A third object of the present invention is to provide an aperture blade driving device as an actuator for driving an aperture blade to open and close the blade which does not form an obstacle in arranging a lens with respect the direction parallel to the principal axis.

According to one aspect of the present invention, a motor device comprises:

a first motor unit including:

a first rotary magnet that is cylindrical and magnetized so as to have different magnetic poles in turn along the circumferential direction;

a first rotary gear having a plurality of teeth, the rotary gear rotating about the rotation axis of the first rotary magnet together with the first rotary magnet; and a stator member having a plurality of outer magnetic poles that are arranged on the outer periphery of the first rotary magnet and a plurality of inner magnetic poles that are arranged on the inner periphery of the first rotary magnet and are opposed to the outer magnetic poles, the plural outer magnetic poles and the plural inner magnetic poles being excited by a first coil;

a second motor unit including:

a second rotary magnet that is cylindrical and magnetized so as to have different magnetic poles in turn along the circumferential direction;

a second rotary gear having a plurality of teeth, the rotary gear rotating about the rotation axis of the second rotary magnet together with the second rotary magnet; and a stator member having a plurality of outer magnetic poles that are arranged on the outer periphery of the second rotary magnet and a plurality of inner magnetic poles that are arranged on the inner periphery of the second rotary magnet and are opposed to the outer magnetic poles, the plural outer magnetic poles and the plural inner magnetic poles being excited by a second coil; and a driven member meshed with the first rotary gear and the second rotary gear, wherein electric power having different phases are supplied to the first and second coils to rotate the first rotary gear and the second rotary gear, which then drive the driven member.

The number of teeth of the first rotary gear is equal to the number of magnetic poles of the first rotary magnet, and the number of teeth of the second rotary gear is equal to the number of magnetic poles of the second rotary magnet.

The number of magnetic poles of the first rotary magnet is equal to the number of magnetic poles of the second rotary magnet.

The first and second motor units are arranged side by side so that their rotation axes are in parallel with each other.

The number of the plural outer magnetic poles is half the number of the magnetic poles of the respective rotary magnets.

The device further comprises an aperture blade that is put in motion when the driven member is driven.

The first rotary gear is formed in the first rotary magnet and the second rotary gear is formed in the second rotary magnet.

According to another aspect of the present invention, a motor device comprises:

a first motor unit including:

a first rotary magnet that is cylindrical and magnetized so as to have different magnetic poles in turn along the circumferential direction, the first rotary magnet having a first gear portion that is formed therein and has a plurality of teeth; and a stator member having a plurality of outer magnetic poles that are arranged on the outer periphery of the first rotary magnet and a plurality of inner magnetic poles that are arranged on the inner periphery of the first rotary magnet and are opposed to the outer magnetic poles, the plural outer magnetic poles and the plural inner magnetic poles being excited by a first coil;

a second motor unit including:

a second rotary magnet that is cylindrical and magnetized so as to have different magnetic poles in turn along the circumferential direction, the second rotary magnet having a second gear portion that is formed therein and has a plurality of teeth; and a stator member having a plurality of outer magnetic poles that are arranged on the outer periphery of the second rotary magnet and a plurality of inner magnetic poles that are arranged on the inner periphery of the second rotary magnet and are opposed to the outer magnetic poles, the plural outer magnetic poles and the plural inner magnetic poles being excited by a second coil; and a driven member meshed with the first gear portion and the second gear portion, wherein electric power having different phases are supplied to the first and second coils to rotate the first gear portion and the second gear portion, which then drive the driven member.

BRIEF DESCRIPTION OF THE DRAWINGS

FIG. 2 is an exploded perspective view of a first driving device;

FIG. 3 is an exploded perspective view of a second driving device;

FIG. 10 is an exploded perspective view of a first driving device shown in FIG. 9;

FIG. 11 is an exploded perspective view of a second driving device shown in FIG. 9;

DESCRIPTION OF THE PREFERRED EMBODIMENTS

Figure 1:
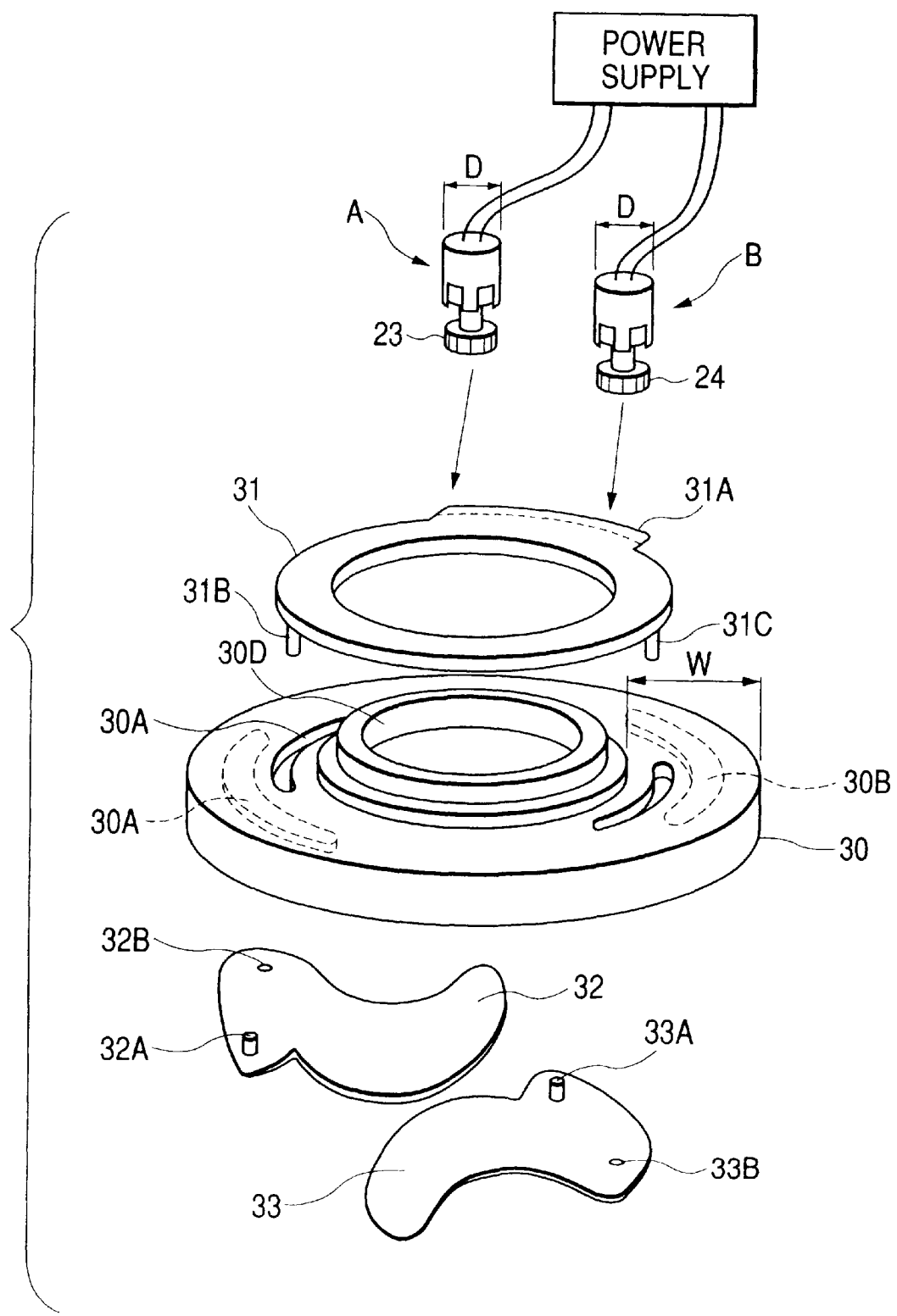
FIG. 1 is an exploded perspective view of an aperture blade driving mechanism.
Figure 4:
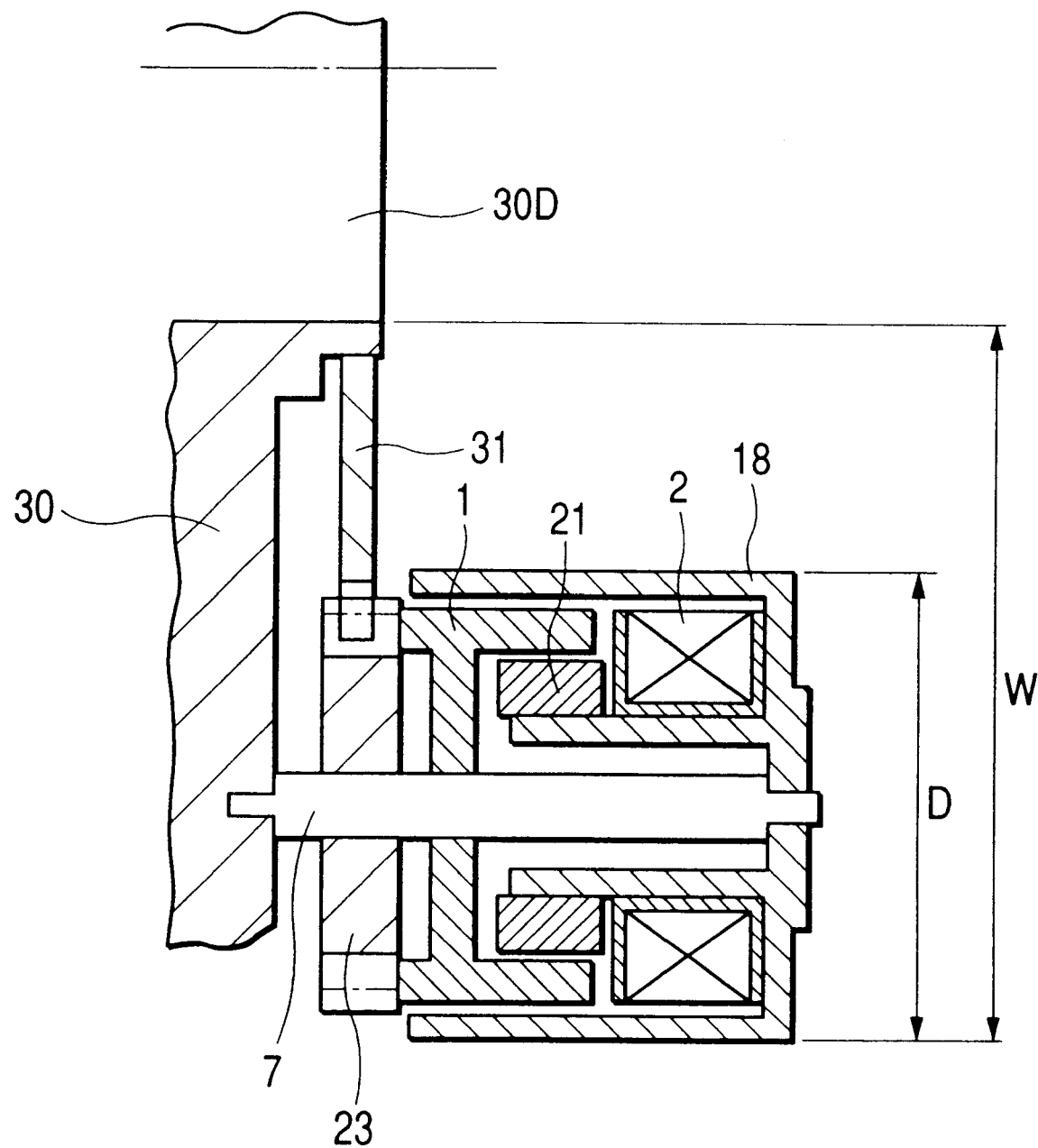
FIG. 4 is a sectional view of the first driving device.
Figure 5:
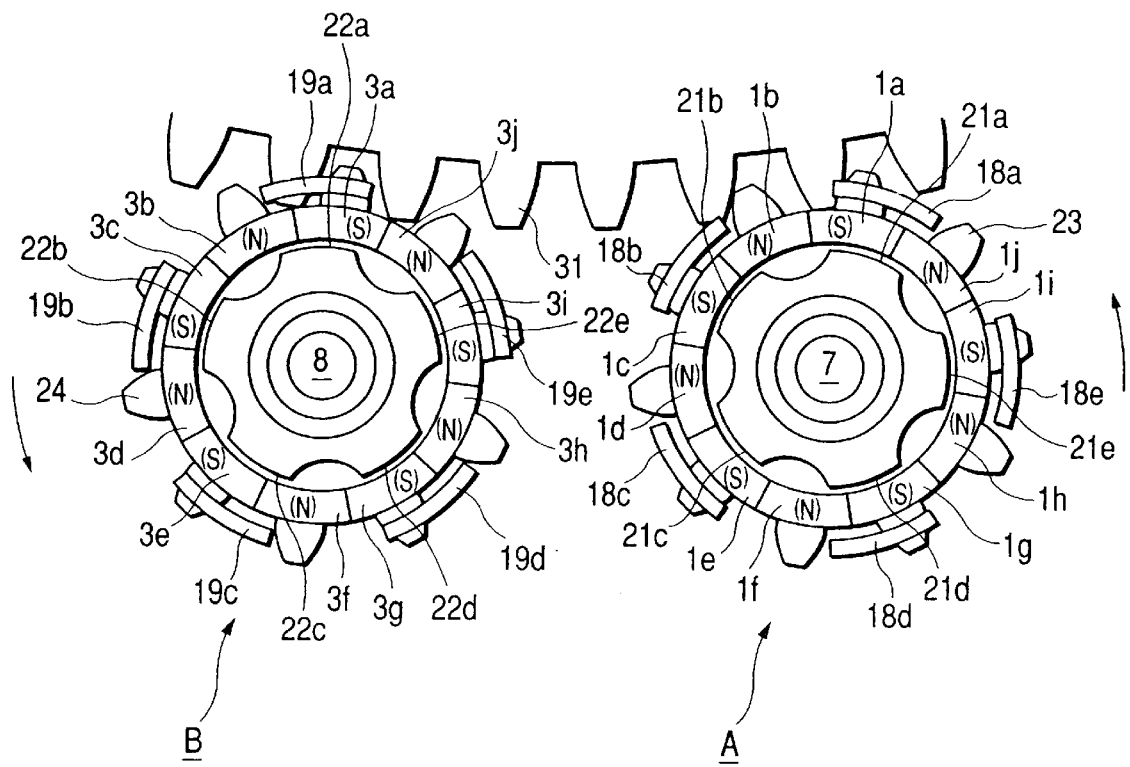
FIG. 5 is a sectional view showing a relation in a motor composed of the first driving device, the second driving device and output means.
Figure 6:
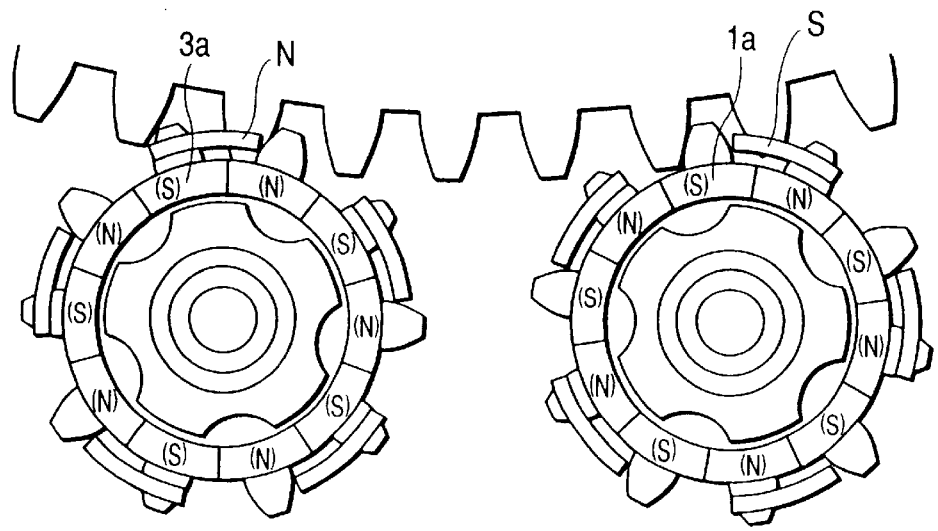
FIG. 6 is a sectional view showing the relation in the motor composed of the first driving device, the second driving device and the output means.
Figure 7:
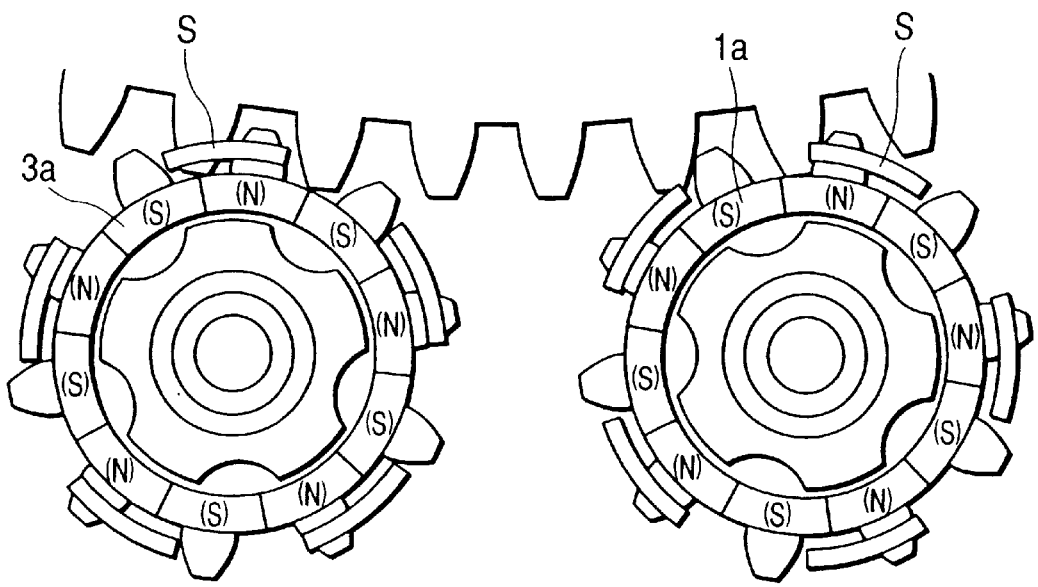
FIG. 7 is a sectional view showing the relation in the motor composed of the first driving device, the second driving device and the output means.
Figure 8:
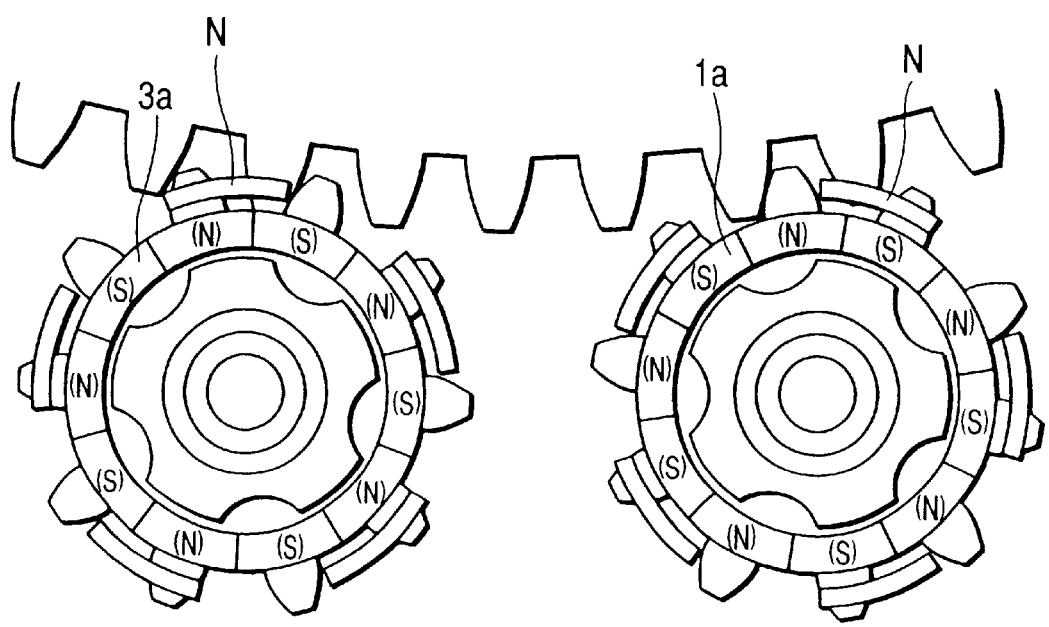
FIG. 8 is a sectional view showing the relation in the motor composed of the first driving device, the second driving device and the output means.

FIGS. 1 to 8 are diagrams showing an embodiment of the present invention. FIG. 1 is an exploded perspective view of an aperture blade driving mechanism. FIG. 2 is an exploded perspective view of a first driving device (motor A) and FIG. 3 is an exploded perspective view of a second driving device (motor B). FIG. 4 is a sectional view of the first driving device (motor A). FIGS. 5 to 8 are sectional views showing a relation in a motor composed of the first driving device (motor A), the second driving device (motor B) and output means. The second driving device has the same structure as the first driving device, and hence a sectional view thereof is identical with the sectional view of the first driving device shown in FIG. 4.

In FIG. 1, aperture blades 32 and 33 are driven through driving forces given by the two motors A and B as will be described later.

In FIG. 2, which is an exploded perspective view of the motor A, reference symbol 1 denotes a cylindrical magnet constituting a rotor. The magnet 1 serving as the rotor has its outer peripheral surface divided into n parts (10 parts in this embodiment) along the circumferential direction to form magnetized portions 1a, 1b, 1c, 1d, 1e, 1f, 1g, 1h, 1i and 1j such that the south poles and the north poles appear alternately. The magnetized portions 1a, 1c, 1e, 1g and 1i are the south poles whereas the magnetized portions 1b, 1d, 1f, 1h and 1j are the north poles. It is desirable to form the magnetic poles of the magnetized portions mainly on the outer surface of the cylinder. The magnet 1 is formed from a plastic magnet material through injection molding. This makes it possible to form the cylinder very thin in its radial direction.

The magnet 1 has at the center in the axial direction an engagement portion 1w whose inner diameter is small. Denoted by 7 is a rotation shaft, which is fixed to the engagement portion 1w of the magnet 1 that is the rotor through press-fitting. The rotation shaft 7 has one end rotatably supported by a first stator 18 and, as shown in FIG. 4, the other end rotatably supported by a base plate 30.

Being formed from a plastic magnet through injection molding, the magnet 1 can be assembled by press-fitting without forming a crack and the manufacture is easy even when the magnet 1 has such a complicated shape as to have the small inner diameter engagement portion 1w at the center in the axial direction. The rotation shaft 7 is also incorporated in and fixed to the magnet 1 through press-fitting, and hence assembly of the rotor is easy and the manufacture thereof does not cost much. The rotor is comprised of the rotation shaft 7 and the magnet 1.

Reference numeral 2 indicates a fixed cylindrical coil. The coil 2 is concentric with the magnet 1 so that the coil 2 is piled on the magnet 1 in the axial direction. The outer diameter of the coil 2 is almost the same as the outer diameter of the magnet 1.

Numeral 18 indicates a first stator which is formed of a soft magnetic material. The first stator is composed of an outer tube and an inner tube whose interior is hollow. The front end of the outer tube of the first stator 18 forms outer magnetic poles 18a, 18b, 18c, 18d and 18e. Denoted by 21 is a first auxiliary stator having an inner diameter portion 21f fitted and fixed to an inner tube 18f of the first stator 18. The outer diameter portion of the first auxiliary stator has opposing portions 21a, 21b, 21c, 21d and 21e in the phase that makes them opposed to the outer magnetic poles 18a, 18b, 18c, 18d and 18e of the first stator. The opposing portions 21a, 21b, 21c, 21d and 21e are arranged with a displacement of 360/(n/2) degrees, i.e., 72 degrees put between every adjacent opposing portions so as to have the same phase as the magnetized portions of the magnet 1. The outer magnetic poles 18a, 18b, 18c, 18d and 18e of the first stator 18 are arranged with a displacement of 360/(n/2) degrees, i.e., 72 degrees put between every adjacent outer magnetic poles so as to have the same phase as the magnetized portions of the magnet 1. The hollow inner tube 18f of the first stator 18 and the auxiliary stator 21 constitute first inner magnetic poles.

Reference numeral 23 indicates a first gear having teeth in a number equal to the number of magnetic poles of the magnetized portions of the magnet 1, i.e, 10 teeth. The first gear 23 is integrated with the magnet 1. As shown in FIGS. 5 to 8, the teeth of the first gear 23 in this embodiment are formed to have a phase that makes their points coincide with the center of the respective magnetic poles of the magnet 1.

FIG. 3 is a perspective view of the motor B shown in FIG. 1. The basic structure thereof is the same as the motor A. Reference numeral 3 indicates a cylindrical magnet constituting a rotor. The magnet 3 serving as the rotor has its outer peripheral surface divided into n parts (10 parts in this embodiment) along the circumferential direction to form magnetized portions 3a, 3b, 3c, 3d, 3e, 3f, 3g, 3h, 3i and 3j such that the south poles and the north poles appear alternately. The magnetized portions 3a, 3c, 3e, 3g and 3i are the south poles whereas the magnetized portions 3b, 3d, 3f, 3h and 3j are the north poles. The magnet 3 is formed from a plastic magnet material through injection molding. This makes it possible to form the cylinder very thin in its radial direction.

The magnet 3 has at the center in the axial direction an engagement portion 3w whose inner diameter is small. Indicated by numeral 8 is a rotation shaft, which is fixed to the engagement portion 3w of the magnet 3 that is the rotor through press-fitting. The rotation shaft 8 has one end rotatably supported by a second stator 19 and, as shown in FIG. 4, the other end rotatably supported by the base plate 30.

Being formed from a plastic magnet through injection molding, the magnet 3 can be assembled by press-fitting without forming a crack and the manufacture is easy even when the magnet 3 has such a complicated shape as to have the small inner diameter engagement portion 3w at the center in the axial direction. The rotation shaft 8 is also incorporated with and fixed to the magnet 3 through press-fitting, and hence assembly of the rotor is easy and the manufacture thereof does not cost much. The rotor is comprised of the rotation shaft 8 and the magnet 3.

Reference numeral 4 indicates a cylindrical coil. The coil 4 is concentric with the magnet 3 so that the coil 4 is piled on the magnet 3 in the axial direction. The outer diameter of the coil 4 is almost the same as the outer diameter of the magnet 3.

Numeral 19 indicates the second stator which is formed of a soft magnetic material. The second stator is composed of an outer tube and an inner tube whose interior is hollow. The front end of the outer tube of the second stator 19 forms outer magnetic poles 19a, 19b, 19c, 19d and 19e. Denoted by 22 is a second auxiliary stator having an inner diameter portion 22f fitted and fixed to an inner tube 19f of the second stator 19. The outer diameter portion of the second auxiliary stator has opposing portions 22a, 22b, 22c, 22d and 22e in the phase that makes them opposed to the outer magnetic poles 19a, 19b, 19c, 19d and 19e of the second stator. The opposing portions 22a, 22b, 22c, 22d and 22e are arranged with a displacement of 360/(n/2) degrees, i.e., 72 degrees put between every adjacent opposing portions so as to have the same phase as the magnetized portions of the magnet 3. The second outer magnetic poles 19a, 19b, 19c, 19d and 19e of the second stator 19 are arranged with a gap of 360/(n/2) degrees, i.e., 72 degrees put between every adjacent outer magnetic poles so as to have the same phase as the magnetized portions of the magnet 3. The hollow inner tube 19f of the second stator 19 and the auxiliary stator 22 constitute second inner magnetic poles.

Reference numeral 24 indicates a second gear having teeth in a number equal to the number of magnetic poles of the magnetized portions of the magnet 3, i.e, 10 teeth. The second gear 24 is integrated with the magnet 3. As shown in FIGS. 5 to 8, the teeth of the second gear 24 in this embodiment are formed to have a phase that makes their points coincide with the center of the respective magnetic poles of the magnet 3.

Back to FIG. 1, the base plate 30 has an engagement portion 30A. Denoted by 31 is an output ring attached to the engagement portion 30A in a rotatable manner. The base plate also has an opening 30D. The first stator 18 of the first driving device A and the second stator 19 of the second driving device B are fixed to the base plate 30 using an adhesive, a screw, or the like.

The first driving device and the second driving device are arranged on the base plate 30 so as to be axially parallel with each other. The output ring 31 has a gear portion 31A. The gear portion 31A is meshed and coupled with the first gear 23 and the second gear 24, the first gear 23 being integrated with the magnet of the first driving device and the second gear 24 being integrated with the magnet of the second driving device.

Thus, the magnet 1 of the first driving device and the magnet 3 of the second driving device can drive in association with each other through the output ring 31. In this case, the first and second driving devices are arranged such that there is a displacement of 180/n degrees, i.e., 18 degrees between the positional relation of the magnetization phase of the magnet 1 to the outer magnetic poles 18a, 18b, 18c, 18d and 18e of the first stator and the positional relation of the magnetization phase of the magnet 3 to the outer magnetic poles 19a, 19b, 19c, 19d and 19e of the second stator.

The output ring 31 is driven and rotated by the first driving device and the second driving device. Details thereof will be described later. The aperture blades 32 and 33 have dowels 32A and 33A, respectively. The dowels 32A and 32B are respectively fitted to cam grooves 30A and 30B formed in the base plate 30 but are slidable along the grooves. Dowels 31B and 31C of the output ring 31 are rotatably fitted to a hole 32B of the aperture blade 32 and a hole 33B of the aperture blade 33, respectively. Rotation of the output ring 31 rotates the aperture blades 32 and 33 about the optical axis to change the stretch of opening. (This aperture mechanism is a known in the art.)

The outer magnetic poles 18a, 18b, 18c, 18d and 18e of the first stator and the outer magnetic poles 19a, 19b, 19c, 19d and 19e of the second stator are both composed of a combination of cut-out holes and teeth extending in the direction parallel to the axis. This structure makes it possible to form magnetic poles while limiting the diameter of the motor to a minimum. If the outer magnetic poles are formed as radially extending concave and convex instead, the diameter of the motor is increased that much. This embodiment employs the outer magnetic poles formed as a combination of cut-out holes and teeth extending in the direction parallel to the axis, and hence the diameter of the first driving device and the diameter of the second driving device can be limited to a minimum. The first driving device and the second driving device are arranged such that the opening 30D is not blocked. Because a diameter D of each of the driving devices is limited to a minimum, a width W of a portion excluding the opening is small and the diameter of the aperture blade driving device itself can also be small. This is illustrated in FIGS. 1 to 4.

The required length for each of the first driving device and the second driving device is equal to the sum of the length of their respective magnets and the length of the first or second coil. Therefore the first and second driving devices can be formed as a very short actuator. The first driving device and the second driving device are arranged side by side so as to be axially parallel to each other, whereby they can constitute an actuator for driving an aperture blade which is short in the direction parallel to the optical axis and which does not form an obstacle to a lens and other components (not shown).

The outer magnetic poles 18a, 18b, 18c, 18d and 18e of the first stator 18 face the outer peripheral surface of the magnet 1 on one end. The outer diameter portions (opposing portions) 21a, 21b, 21c, 21d and 21e of the first auxiliary stator which constitute a part of the first inner magnetic poles face the inner peripheral surface of the magnet 1 on one end. That one end of the magnet 1 is sandwiched between the outer magnetic poles of the first stator and the outer diameter portions (opposing portions) of the first auxiliary stator.

The outer magnetic poles 19a, 19b, 19c, 19d and 19e of the second stator 19 face the outer peripheral surface of the magnet 3 on one end. The outer diameter portions (opposing portions) 22a, 22b, 22c, 22d and 22e of the second auxiliary stator which constitute a part of the second inner magnetic poles face the inner peripheral surface of the magnet 3 on one end. That one end of the magnet 3 is sandwiched between the outer magnetic poles of the second stator and the outer diameter portions (opposing portions) of the second auxiliary stator.

The coil 2 is provided between the outer tube of the first stator 18 and the inner tube thereof. Energization of the coil 2 excites the first stator 18 and the first auxiliary yoke (auxiliary stator) 21.

The coil 4 is provided between the outer tube of the second stator 19 and the inner tube thereof. Energization of the coil 4 excites the second stator 19 and the second auxiliary yoke (auxiliary stator) 22.

Therefore, the flux of magnetic force generated from the coil 2 crosses the magnet 1 that is the rotor placed between the outer magnetic poles 18a, 18b, 18c, 18d and 18e and the opposing portions 21a, 21b, 21c, 21d and 21e that constitute a part of the inner magnetic poles. The flux of magnetic force thus effectively acts on the magnet 1 that is the rotor. On the other hand, the flux of magnetic force generated from the coil 4 crosses the magnet 3 that is the rotor placed between the outer magnetic poles 19a, 19b, 19c, 19d and 19e and the opposing portions 22a, 22b, 22c, 22d and 22e that constitute a part of the inner magnetic poles. The flux of magnetic force thus effectively acts on the magnet 3 that is the rotor. The output of the motor can therefore be increased.

The first inner magnetic poles form a circle that has an outer diameter larger than the inner diameter of the first coil and the second inner magnetic poles form a circle that has an outer diameter larger than the inner diameter of the second coil. Therefore, the distance between the first outer magnetic poles and the first inner magnetic poles, as well as the distance between the second outer magnetic poles and the second inner magnetic poles can be close even when the inner diameter of the coils are reduced to increase the volume of the coils. This makes the magnetic resistance viewed from the coil side small, and hence more flux of magnetic force can be produced with a small electric power. The output of the motor thus can be increased.

FIGS. 5 to 8 are sectional views showing a relation in the motor composed of the first driving device, the second driving device and output means.

The first and second driving devices are arranged such that there is a displacement of 180/n degrees, i.e., 18 degrees between the positional relation of the magnetization phase of the magnet 1 to the outer magnetic poles 18a, 18b, 18c, 18d and 18e of the first stator and the positional relation of the magnetization phase of the magnet 3 to the outer magnetic poles 19a, 19b, 19c, 19d and 19e of the second stator.

The description given next is of the output ring 31 being driven by the first driving device and the second driving device. Under the state shown in FIG. 5, the coil 2 is energized for excitation to set the outer magnetic poles 18a, 18b, 18c, 18d and 18e of the first stator 18 to the south poles and to set the opposing portions 21a, 21b, 21c, 21d and 21e of the first auxiliary yoke (auxiliary stator) 21 which constitute a part of the first inner magnetic poles to the north poles. On the other hand, the coil 4 is energized for excitation to set the outer magnetic poles 19a, 19b, 19c, 19d and 19e of the second stator 19 to the north poles and to set the opposing portions 22a, 22b, 22c, 22d and 22e of the second auxiliary yoke (auxiliary stator) 22 which constitute a part of the second inner magnetic poles to the south poles. As a result, the magnet 1 and the magnet 3 coupled to each other by the output ring 31 rotate by 18 degrees counterclockwise. The output ring 31 rotates simultaneously and is moved to the corresponding position to reach the state shown in FIG. 6, and then rotations of the motors are stopped at the state shown in FIG. 6.

While keeping the energization of the coil 2 as it is, the energization of the coil 4 is then inverted. To be specific, the outer magnetic poles 18a, 18b, 18c, 18d and 18e of the first stator 18 remain set to the south poles and the opposing portions 21a, 21b, 21c, 21d and 21e of the first auxiliary yoke (auxiliary stator) 21 which constitute a part of the first inner magnetic poles remain set to the north poles, whereas the excitation sets the outer magnetic poles 19a, 19b, 19c, 19d and 19e of the second stator 19 to the south poles and sets the opposing portions 22a, 22b, 22c, 22d and 22e of the second auxiliary yoke (auxiliary stator) 22 which constitute a part of the second inner magnetic poles to the north poles. As a result, the magnet 1 and the magnet 3 coupled to each other by the output ring 31 rotate by 18 degrees counterclockwise. The output ring 31 rotates simultaneously and is moved to the corresponding position to reach the state shown in FIG. 7, and then rotations of motors are stopped at the state shown in FIG. 7.

Next, while keeping the energization of the coil 4 as it is, the energization of the coil 2 is inverted. To be specific, the outer magnetic poles 18a, 18b, 18c, 18d and 18e of the first stator 18 remain set to the north poles and the opposing portions 21a, 21b, 21c, 21d and 21e of the first auxiliary yoke (auxiliary stator) 21 which constitute a part of the first inner magnetic poles remain set to the south poles, whereas the excitation sets the outer magnetic poles 19a, 19b, 19c, 19d and 19e of the second stator 19 to the north poles and sets the opposing portions 22a, 22b, 22c, 22d and 22e of the second auxiliary yoke (auxiliary stator) 22 which constitute a part of the second inner magnetic poles to the south poles. As a result, the magnet 1 and the magnet 3 coupled to each other by the output ring 31 rotate by 18 degrees counterclockwise. The output ring 31 rotates simultaneously and is moved to the corresponding position to reach the state shown in FIG. 8, and then rotations of motors are stopped at the state shown in FIG. 8.

In this way, the direction of energization of the coil 4 is successively switched, whereby the magnet 1, the magnet 3 and the output ring 31 are simultaneously rotated and moved to the position corresponding to the energization phase. That is, a power supply in FIG. 1 supplies electric power to the coils 2 and 4 with the phase shifted by 90 degrees each time. If the motor is to be rotated backward, the coils 2 and 4 are energized while inverting the phase.

Now, the optimum structure for the thus structured actuator to have a ultra-small size will be described. The basic structure of the actuator includes:

1) shaping the magnet of each of the first driving device and the second driving device into a hollow cylinder;
2) dividing the outer peripheral surface of the magnet of each of the first driving device and the second driving device into n parts along the circumferential direction and magnetizing it so as to form different magnetic poles alternately;
3) piling the coil on the magnet in the axial direction of the magnet in each of the first driving device and the second driving device;
4) opposing the outer magnetic poles of the first stator excited by the first coil to the outer peripheral surface of the magnet of the first driving device whereas opposing the inner magnetic poles thereof to the inner peripheral surface of the magnet, and opposing the outer magnetic poles of the second stator excited by the second coil to the outer peripheral surface of the magnet of the second driving device whereas opposing the inner magnetic poles thereof to the inner peripheral surface of the magnet;
5) using a combination of cut-out holes and teeth extending in the direction parallel to the axis as the outer magnetic poles of each of the first driving device and the second driving device; and
6) arranging the first driving device and the second driving device in parallel to each other.

The required diameter for each of the first driving device and the second driving device is substantially equal to the sum of the diameter of the magnet and the thickness of the magnetic poles of the stator which face the peripheral surfaces of the magnet. The required length for each of the first driving device and the second driving device is substantially equal to the sum of the length of their respective magnets and the length of the first or second coil. Therefore the diameter and the length of the magnet and the coil determine the size of the first driving device and the second driving device. When the diameter and the length of the magnet and the coil are very small, ultra-small size first driving device and second driving device can be obtained.

With a very short diameter and a very short length for the magnet and the coil, it is difficult to maintain the precision as the first driving device and the second driving device. However, this problem regarding the precision of the first driving device and the second driving device is solved by a simple structure in which the magnet is formed into a hollow cylinder and the outer magnetic poles of the first (second) stator face the outer peripheral surface of the magnet shaped into a hollow cylinder whereas the inner magnetic poles thereof face the inner peripheral surface of the magnet. If the inner peripheral surface of the magnet is divided along the peripheral surface and magnetized in addition to the outer peripheral surface of the magnet, the output of the motor can be enhanced even more.

The first driving device and the second driving device are arranged such that the opening 30D is not blocked. The diameter of the respective driving devices is thus limited to a minimum, thereby making the diameter of the aperture blade driving device itself small.

The first driving device and the second driving device are arranged side by side so as to be axially parallel to each other, whereby they can constitute an actuator for driving an aperture blade which is short in the direction parallel to the optical axis and which does not form an obstacle to a lens and other components.

As described above, the first and second driving devices have to be arranged such that there is a displacement of 180/n degrees, i.e., 18 degrees between the positional relation of the magnetization phase of the magnet 1 to the outer magnetic poles 18a, 18b, 18c, 20 18d and 18e of the first stator and the positional relation of the magnetization phase of the magnet 3 to the outer magnetic poles 19a, 19b, 19c, 19d and 19e of the second stator. The first gear 23 has teeth in a number equal to the number of magnetic poles of the magnetized portions of the magnet 1, i.e, 10 teeth and is integrated with the magnet 1. The second gear 24 has teeth in a number equal to the number of magnetic poles of the magnetized portions of the magnet 3, i.e, 10 teeth and is integrated with the magnet 3.

Therefore, an assembling worker can tell the magnetization phase of the magnets by looking at the phase of the teeth of the first gear and the second gear. The teeth of the gears in this embodiment are formed to have a phase that makes their points coincide with the center of the respective magnetic poles of the magnets.

Since the magnetization phase of the magnet can be confirmed visually by looking at the position of the teeth of the gears, it is easy to set the relative rotational position, through the output means, of the magnet of the first driving device and the magnet of the second driving device to a predetermined position for the assembling. The efficiency in assembling work is therefore improved.

The magnet 1 and the magnet 3 in this embodiment are coupled to each other with the gear of output ring by the gears having teeth in a number corresponding to the number of magnetic poles of the magnetized portions. However, the number of teeth of the first gear and the second gear may not be the same as the number of magnetic poles of the magnetized portions of the magnet 1 and the magnet 3 in the case where facilitating the assembling is not a particularly pursued object.

The magnet 1 and the magnet 3 are coupled to each other by the first gear 23 and the second gear 24 and by the gear portion 31A of the output ring 31. However, other coupling methods can also be employed. For instance, pins are provided in the magnet 1 and the magnet 3 and grooves are formed in the output ring so that the pins are fitted to the grooves. The structure as such will be sufficient if the magnet 1 and the magnet 3 rotate less.

In this embodiment, the drive transmission device composed of the first driving device, the second driving device and the output ring that is a transmission mechanism is used as an actuator for driving an aperture blade to open and close the blade. However, the drive transmission device is also useful in other applications as a device that is advantageous in its high output, small diameter and short axial length. For example, the device can be used to rotate a cam barrel for driving a lens.

In the structure above, the magnetization phase of the magnet corresponds to the teeth of the gear on one on one basis. Therefore it is easy to set the relative rotational position, through the transmission mechanism, of the magnet of the first driving device and the magnet of the second driving device to a predetermined position for the assembling. The efficiency in assembling work is therefore improved.

The diameter of each of the first driving device and the second driving device is determined by the outer magnetic poles that face the outer peripheral surface of the magnet. The axial length of each of the first driving device and the second driving device is determined by arranging the coil and the magnet in this order. The first driving device and the second driving device thus can be made very small. The flux of magnetic force generated from the coil crosses the magnet placed between the outer magnetic poles and the inner magnetic poles to act on the magnet effectively. The transmission mechanism coupled to the magnet of the first driving device and the magnet of the second driving device makes the drive transmission device bidirectionally rotatable.

The first driving device and the second driving device are arranged side by side so as to be axially parallel to each other. With the first driving device and the second driving device being arranged axially parallel to each other, a drive transmission device having a short axial length can be obtained.

The transmission mechanism coupled to the magnet of the first driving device and the magnet of the second driving device drives the aperture blade to open and close the blade.

The aperture blade driving device thus can serve as an actuator for driving an aperture blade to open and close the blade which does not form an obstacle in arranging a lens with respect the direction parallel to the optical axis.

Next, a more improved embodiment will be described.

Figure 9:
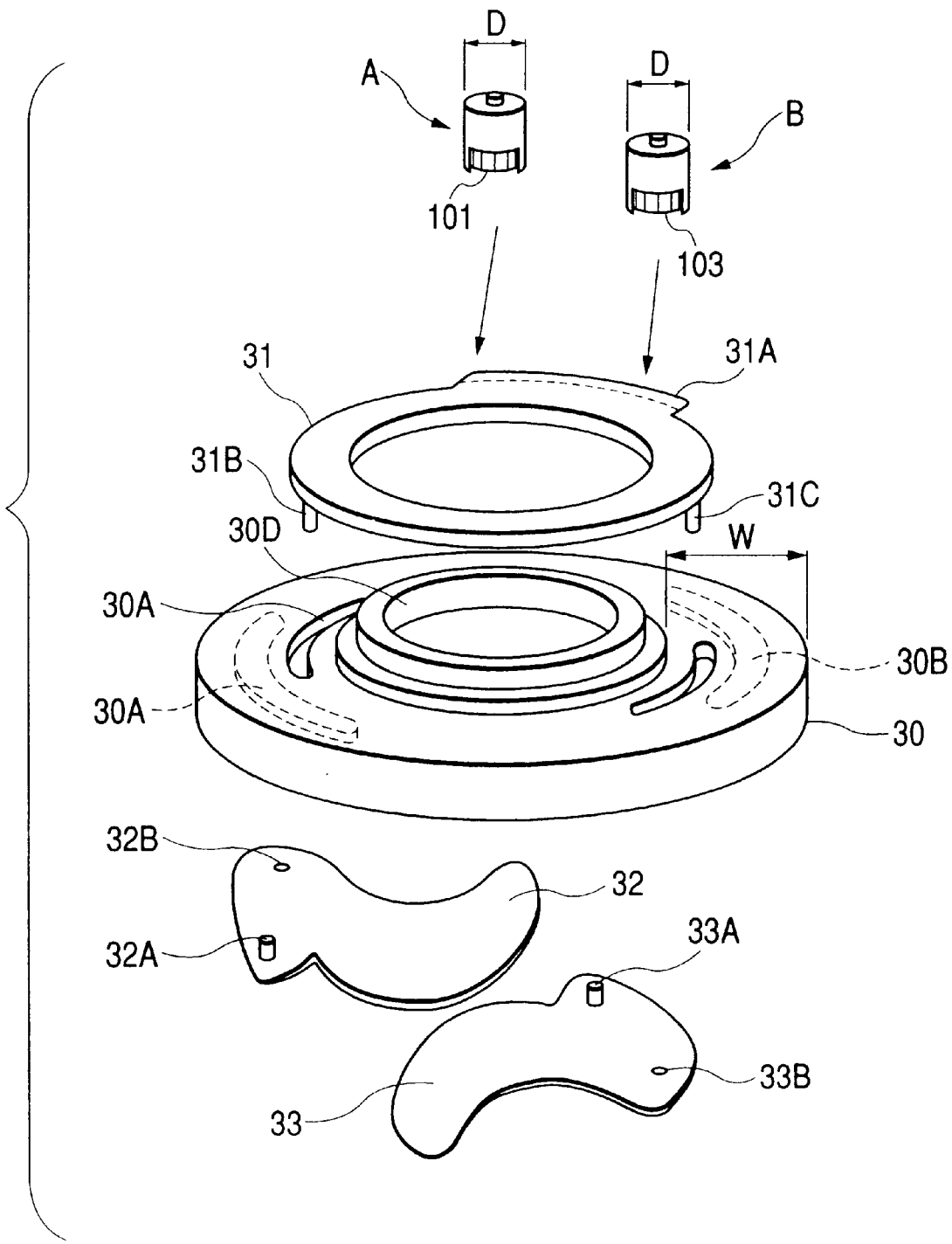
FIG. 9 is an exploded perspective view of an aperture blade driving mechanism according to the present invention.
Figure 12:
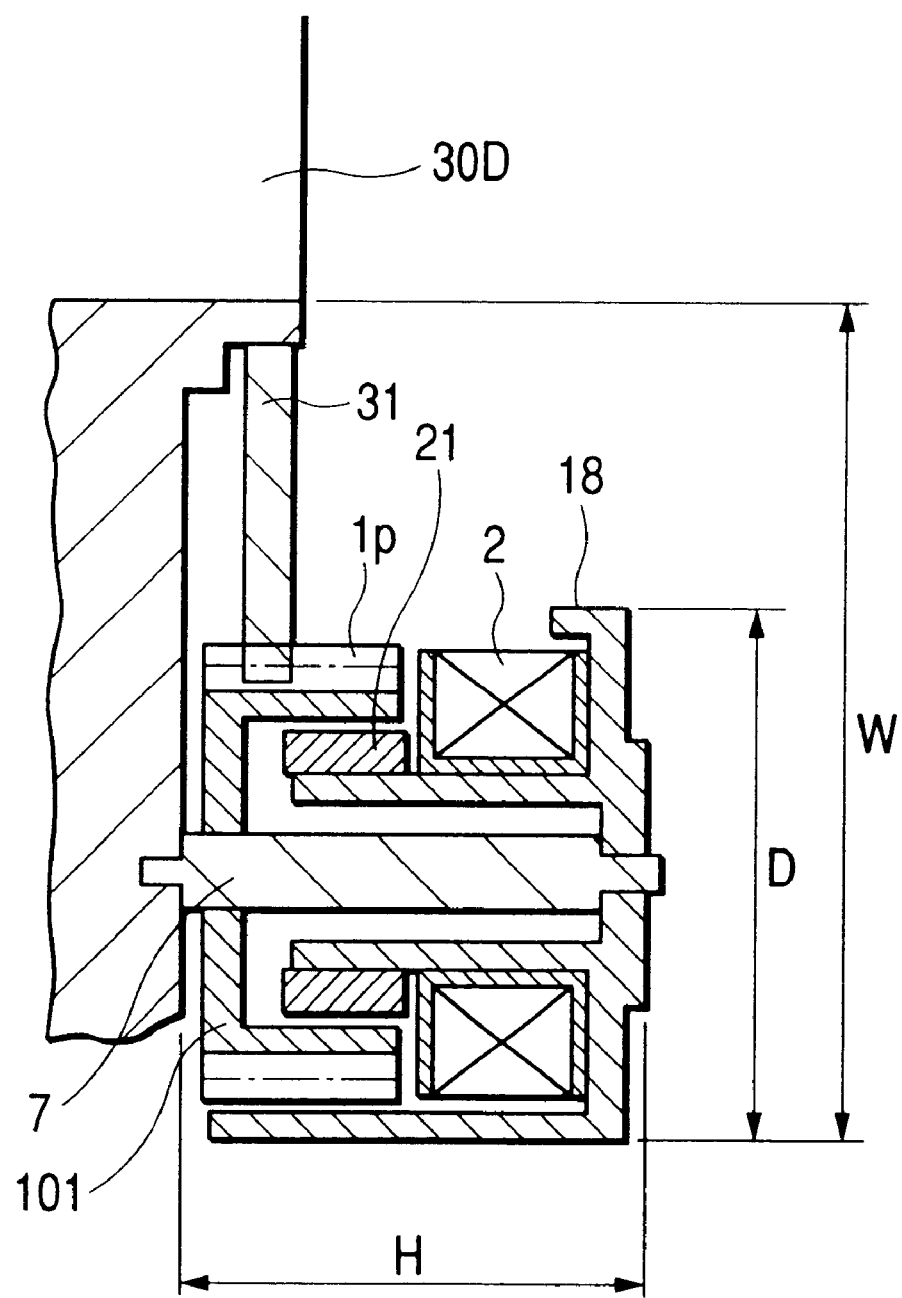
FIG. 12 is a sectional view of the first driving device.

FIGS. 9 to 16 are diagrams showing the improved embodiment of the present invention. FIG. 9 is an exploded perspective view of an aperture blade driving mechanism. FIG. 10 is an exploded perspective view of a first driving device (motor A) and FIG. 11 is an exploded perspective view of a second driving device (motor B). FIG. 12 is a sectional view of the first driving device. FIGS. 13 to 16 are sectional views showing a relation in a motor composed of the first driving device, the second driving device and output means. The second driving device has the same structure as the first driving device, and hence a sectional view thereof is identical with the sectional view of the first driving device shown in FIG. 12.

In FIG. 10 that shows an exploded perspective view of the motor A, reference symbol 101 denotes a cylindrical magnet constituting a rotor. The magnet 101 serving as the rotor has its outer peripheral surface divided into n parts (10 parts in this embodiment) along the circumferential direction to form magnetized portions 1a, 1b, 1c, 1d, 1e, 1f, 1g, 1h, 1i and 1j such that the south poles and the north poles appear alternately. The magnetized portions 1a, 1c, 1e, 1g and 1i are the south poles whereas the magnetized portions 1b, 1d, 1f, 1h and 1j are the north poles. The magnet 101 is formed from a plastic magnet material through injection molding. This makes it possible to form the cylinder very thin in its radial direction.

Figure 17:
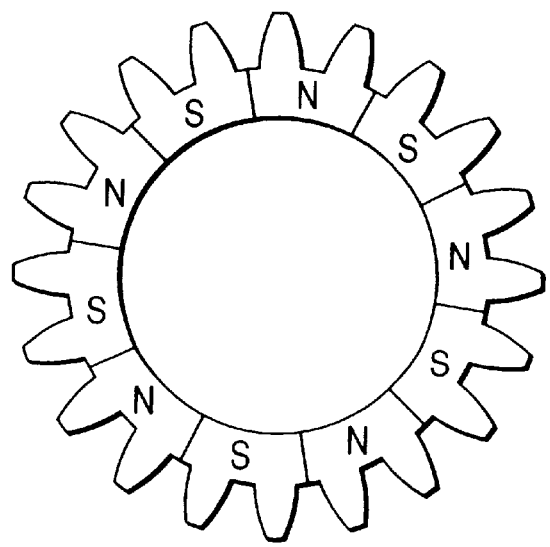
FIG. 17 is a plan view showing the relation between a gear portion of a magnet and a magnetization phase in accordance with another embodiment.
Figure 18:
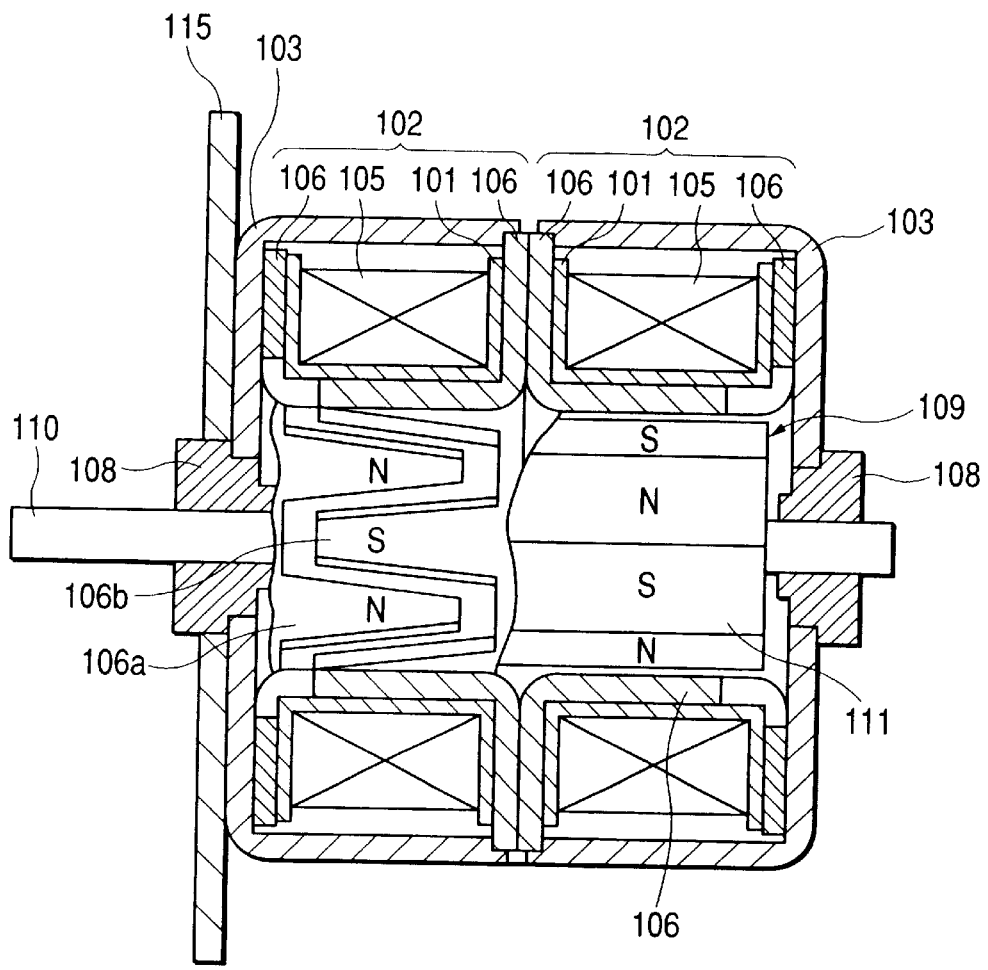
FIG. 18 is a sectional view of a step motor in prior art.
Figure 19:
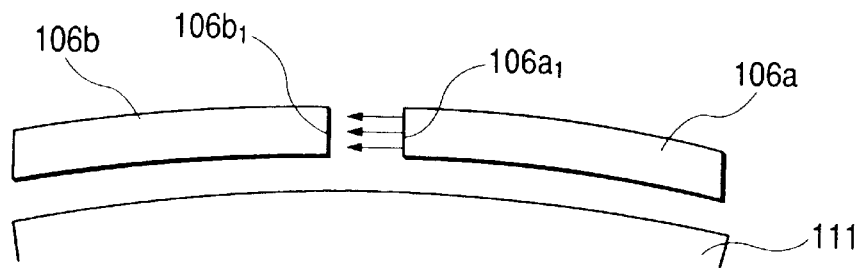
FIG. 19 is a sectional view showing a part of a stator in the step motor of prior art.
Figure 20:
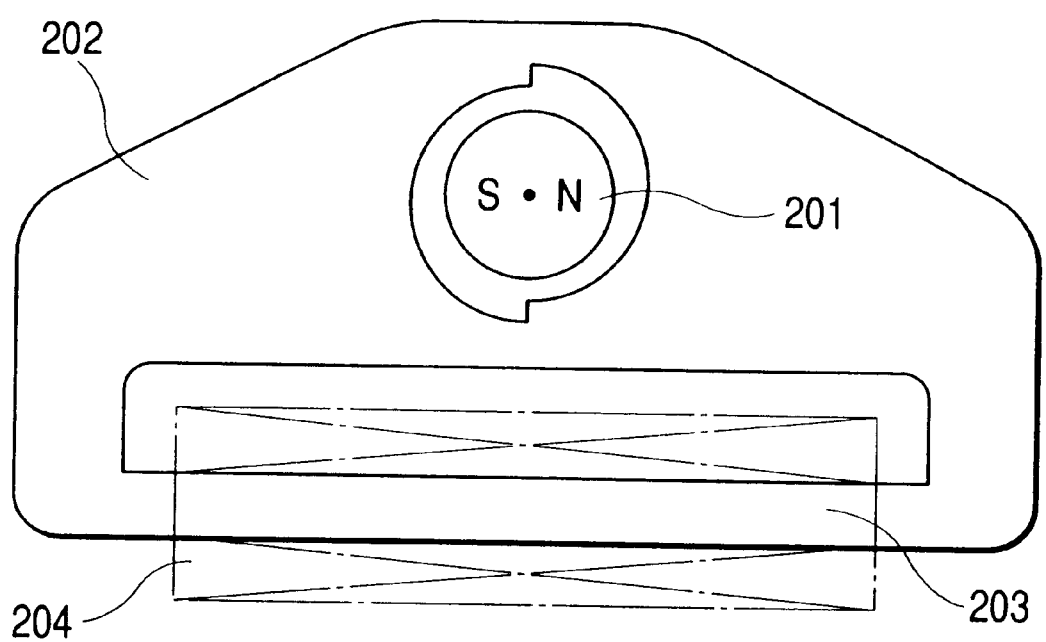
FIG. 20 is a plan view of another step motor in prior art.

The magnet 101 has at the center in the axial direction an engagement portion 1w whose inner diameter is small. Reference symbol 1p denotes a gear portion formed in the magnet and has teeth in a number corresponding to the number of the magnetic poles of the magnetized portions of the magnet 101, i.e., 10 teeth. The teeth of the gear portion are magnetized, of course. The phase of the teeth and the magnetization phase in this embodiment are such that the points of the teeth coincide with the center of the respective magnetic poles of the magnet as shown in FIGS. 13 to 16. The number of teeth can be set at discretion as long as it is any one of integral multiples of the number of magnetic poles of the magnetized portions. For instance, the number of teeth may be twice the number of magnetic poles of the magnetized portions (10 poles) and twenty teeth are formed. In this case, the teeth are arranged so as to be symmetrical with respect to the center of the respective magnetic poles of the magnetized portions as shown in FIG. 17. Whether the number of teeth is 10 or 20, the teeth are arranged so as to be symmetrical with respect to the center of the respective magnetic poles of the magnetized portions and the external shape is also symmetrical with respect to the center of the respective magnetic poles of the magnetized portions. The magnet thus has magnetization intensity symmetrical with respect to the center of the respective magnetic poles of the magnetized portions, thereby providing a stable output.

Denoted by 7 is a rotation shaft, which is fixed to the engagement portion 1w of the magnet 101 that is the rotor through press-fitting. The rotation shaft 7 has one end rotatably supported by a first stator 18 and the other end rotatably supported by a base plate 30.

Being formed from a plastic magnet through injection molding, the magnet 101 can be assembled by press-fitting without forming a crack and the manufacture is easy even when the magnet 101 has such a complicated shape as to have the small inner diameter engagement portion 1w at the center in the axial direction. The rotation shaft 7 is also incorporated with and fixed to the magnet 101 through press-fitting, and hence assemble of the rotor is easy and the manufacture thereof does not cost much. The rotor is comprised of the rotation shaft 7 and the magnet 101. Reference symbol 2 denotes a cylindrical coil. The coil 2 is concentric with the magnet 101 so that the coil 2 is piled on the magnet 101 in the axial direction. The outer diameter of the coil 2 is almost the same as the outer diameter of the magnet 101.

The first stator 18 is formed from a soft magnetic material. The first stator is composed of an outer tube and an inner tube whose interior is hollow. The front end of the outer tube of the first stator 18 forms (N/2−1), i.e., four outer magnetic poles 18a, 18b, 18c, and 18d. Denoted by 21 is a first auxiliary stator having an inner diameter portion 21f fitted and fixed to an inner tube 18f of the first stator 18. The outer diameter portion of the first auxiliary stator has opposing portions 21a, 21b, 21c, and 21d in the phase that makes them oppose to the outer magnetic poles 18a, 18b, 18c and 18d of the first stator. The opposing portions 21a, 21b, 21c, and 21d are arranged with a displacement of one of integral multiples of 360/(n/2) degrees, i.e., one of integral multiples of 72 degrees put between every adjacent opposing portions so as to have the same phase as the magnetized portions of the magnet 101. The outer magnetic poles 18a, 18b, 18c, and 18d of the first stator 18 are arranged with a displacement of one of integral multiples of 360/(n/2) degrees, i.e., one of integral multiples of 72 degrees put between every adjacent outer magnetic poles so as to have the same phase as the magnetized portions of the magnet 101. The gap between the outer magnetic poles 18a and 18b, the gap between the outer magnetic poles 18b and 18c, and the gap between the outer magnetic poles 18c and 18d are each 360/(n/2) degrees, i.e., 72 degrees. Only the gap between the outer magnetic poles 18a and 18d is twice the 360/(n/2) degrees, i.e., 144 degrees.

The hollow inner tube 18f of the first stator 18 and the auxiliary stator 21 constitute first inner magnetic poles.

FIG. 11 is a perspective view of the motor B. Reference symbol 103 denotes a cylindrical magnet constituting a rotor. The magnet 103 serving as the rotor has its outer peripheral surface divided into n parts (10 parts in this embodiment) along the circumferential direction to form magnetized portions 3a, 3b, 3c, 3d, 3e, 3f, 3g, 3h, 3i and 3j such that the south poles and the north poles appear alternately. The magnetized portions 3a, 3c, 3e, 3g and 3i are the south poles whereas the magnetized portions 3b, 3d, 3f, 3h and 3j are the north poles. The magnet 103 is formed from a plastic magnet material through injection molding. This makes it possible to form the cylinder very thin in its radial direction.

The magnet 103 has at the center in the axial direction an engagement portion 3w whose inner diameter is small. Reference symbol 3p denotes a gear portion formed in the magnet and has teeth in a number corresponding to the number of the magnetic poles of the magnetized portions of the magnet 103, i.e., 10 teeth. The teeth of the gear portion are magnetized, of course. The phase of the teeth and the magnetization phase in this embodiment are such that the points of the teeth coincide with the center of the respective magnetic poles of the magnet as shown in FIGS. 13 to 16. The number of teeth can be set at discretion as long as it is any one of integral multiples of the number of magnetic poles of the magnetized portions. For instance, the number of teeth may be twice the number of magnetic poles of the magnetized portions (10 poles) and twenty teeth are formed. In this case, the teeth are arranged so as to be symmetrical with respect to the center of the respective magnetic poles of the magnetized portions as shown in FIG. 17. Whether the number of teeth is 10 or 20, the teeth are arranged so as to be symmetrical with respect to the center of the respective magnetic poles of the magnetized portions and the external shape is also symmetrical with respect to the center of the respective magnetic poles of the magnetized portions. The magnet thus has magnetization intensity symmetrical with respect to the center of the respective magnetic poles of the magnetized portions, thereby providing a stable output.

Denoted by 8 is a rotation shaft, which is fixed to the engagement portion 3w of the magnet 103 that is the rotor through press-fitting. The rotation shaft 8 has one end rotatably supported by a second stator 19 and the other end rotatably supported by the base plate 30. Being formed from a plastic magnet through injection molding, the magnet 103 can be assembled by press-fitting without forming a crack and the manufacture is easy even when the magnet 103 has such a complicated shape as to have the small inner diameter engagement portion 3w at the center in the axial direction. The rotation shaft 8 is also incorporated with and fixed to the magnet 103 through press-fitting, and hence assemble of the rotor is easy and the manufacture thereof does not cost much. The rotor is comprised of the rotation shaft 8 and the magnet 103. Reference symbol 4 denotes a cylindrical coil. The coil 4 is concentric with the magnet 103 so that the coil 4 is piled on the magnet 103 in the axial direction. The outer diameter of the coil 4 is almost the same as the outer diameter of the magnet 103.

The second stator 19 is formed from a soft magnetic material. The second stator is composed of an outer tube and an inner tube whose interior is hollow. The front end of the outer tube of the second stator 19 forms outer magnetic poles 19a, 19b, 19c and 19d. Denoted by 22 is a second auxiliary stator having an inner diameter portion 22f fitted and fixed to an inner tube 19f of the second stator 19. The outer diameter portion of the second auxiliary stator has opposing portions 22a, 22b, 22c and 22d in the phase that makes them opposed to the outer magnetic poles 19a, 19b, 19c and 19d of the second stator. The opposing portions 22a, 22b, 22c, and 22d are arranged with a displacement of one of integral multiples of 360/(n/2) degrees, i.e., one of integral multiples of 72 degrees put between every adjacent opposing portions so as to have the same phase as the magnetized portions of the magnet 103. The second outer magnetic poles 19a, 19b, 19c, and 19d of the second stator 19 are arranged with a displacement of one of integral multiples of 360/(n/2) degrees, i.e., one of integral multiples of 72 degrees put between every adjacent outer magnetic poles so as to have the same phase as the magnetized portions of the magnet 103. The gap between the outer magnetic poles 19a and 19b, the gap between the outer magnetic poles 19b and 19c, and the gap between the outer magnetic poles 19c and 19d are each 360/(n/2) degrees, i.e., 72 degrees. Only the gap between the outer magnetic poles 19a and 19d is twice the 360/(n/2) degrees, i.e., 144 degrees.

The hollow inner tube 19f of the second stator 19 and the auxiliary stator 22 constitute second inner magnetic poles.

In this embodiment, the phase of the teeth is such that the points of the teeth coincide with the center of the respective magnetic poles of the magnet as shown in FIGS. 13 to 16.

The base plate 30 has an engagement portion 30A. Denoted by 31 is an output ring attached to the engagement portion 30A in a rotatable manner. The base plate also has an opening 30D. The first stator 18 of the first driving device A and the second stator 19 of the second driving device B are fixed to the base plate 30 using a known method such as bonding or fastening a screw.

The first driving device and the second driving device are arranged on the base plate 30 so as to be axially parallel with each other. The output ring 31 has a gear portion 31A. The gear portion 31A is meshed and coupled with the gear portion 1p and the gear portion 3p, the gear portion 1p being integrated with the magnet of the first driving device and the gear portion 3p being integrated with the magnet of the second driving device.

Thus, the magnet 101 of the first driving device and the magnet 103 of the second driving device can drive in association with each other through the output ring 31. In this case, the first and second driving devices are arranged such that there is a displacement of 180/n degrees, i.e., 18 degrees between the positional relation of the magnetization phase of the magnet 101 to the outer magnetic poles 18a, 18b, 18c and 18d of the first stator and the positional relation of the magnetization phase of the magnet 103 to the outer magnetic poles 19a, 19b, 19c and 19d of the second stator. The output ring 31 meshes with the gear portion of the magnet 101 at a position in the wide gap between the magnetic poles 18a and 18d which is wider than the gaps between the other outer magnetic poles of the first stator. The output ring 31 meshes with the gear portion of the magnet 103 at a position in the wide gap between the magnetic poles 19a and 19d which is wider than the gaps between the other outer magnetic poles of the second stator. Therefore, the output ring can be placed in a position that axially overlaps the outer magnetic poles without touching any outer magnetic pole. This helps the motor reducing its axial dimension, namely a dimension H in FIG. 12.

The output ring 31 is driven and rotated by the first driving device and the second driving device. Details thereof will be described later. Aperture blades 32 and 33 have dowels 32A and 33A, respectively. The dowels 32A and 32B are respectively fitted to cam grooves 30A and 30B formed in the base plate 30 but are slidable along the grooves. Dowels 31B and 31C of the output ring 31 are rotatably fitted to a hole 32B of the aperture blade 32 and a hole 33B of the aperture blade 33, respectively. Rotation of the output ring 31 rotates the aperture blades 32 and 33 about the optical axis to change the stretch of opening.

The outer magnetic poles 18a, 18b, 18c and 18d of the first stator and the outer magnetic poles 19a, 19b, 19c and 19d of the second stator are both composed of a combination of cut-out holes and teeth extending in the direction parallel to the axis. This structure makes it possible to form magnetic poles while limiting the diameter of the motor to a minimum. If the outer magnetic poles are formed as radially extending concave and convex instead, the diameter of the motor is increased that much. This embodiment employs the outer magnetic poles formed as a combination of cut-out holes and teeth extending in the direction parallel to the axis, and hence the diameter of the first driving device and the diameter of the second driving device can be limited to a minimum. The first driving device and the second driving device are arranged such that the opening 30D is not blocked. Because a diameter D of each of the driving devices is limited to a minimum, a width W of a portion excluding the opening is small and the diameter of the aperture blade driving device itself can also be small. This is illustrated in FIGS. 9 and 12.

The required length for each of the first driving device and the second driving device is equal to the sum of the length of their respective magnets and the length of the first or second coil. Therefore the first and second driving devices can be formed as a very short actuator. The first driving device and the second driving device are arranged side by side so as to be axially parallel to each other, whereby they can constitute an actuator for driving an aperture blade which is short in the direction parallel to the optical axis and which does not form an obstacle to a lens and other components.

The outer magnetic poles 18a, 18b, 18c and 18d of the first stator 18 face the outer peripheral surface of the magnet 101 on one end. The outer diameter portions (opposing portions) 21a, 21b, 21c and 21d of the first auxiliary stator which constitute a part of the first inner magnetic poles face the inner peripheral surface of the magnet 101 on one end. That one end of the magnet 101 is sandwiched between the outer magnetic poles of the first stator and the outer diameter portions (opposing portions) of the first auxiliary stator.

The outer magnetic poles 19a, 19b, 19c and 19d of the second stator 19 face the outer peripheral surface of the magnet 103 on one end. The outer diameter portions (opposing portions) 22a, 22b, 22c and 22d of the second auxiliary stator which constitute a part of the second inner magnetic poles face the inner peripheral surface of the magnet 103 on one end. That one end of the magnet 103 is sandwiched between the outer magnetic poles of the second stator and the outer diameter portions (opposing portions) of the second auxiliary stator.

The coil 2 is provided between the outer tube of the first stator 18 and the inner tube thereof. Energization of the coil 2 excites the first stator 18 and the first auxiliary yoke (auxiliary stator) 21.

The coil 4 is provided between the outer tube of the second stator 19 and the inner tube thereof. Energization of the coil 4 excites the second stator 19 and the second auxiliary yoke (auxiliary stator) 22.

Therefore, the flux of magnetic force generated from the coil 2 crosses the magnet 101 that is the rotor placed between the outer magnetic poles 18a, 18b, 18c and 18d and the opposing portions 21a, 21b, 21c and 21d that constitute a part of the inner magnetic poles. The flux of magnetic force thus effectively acts on the magnet 101 that is the rotor. On the other hand, the flux of magnetic force generated from the coil 4 crosses the magnet 103 that is the rotor placed between the outer magnetic poles 19a, 19b, 19c and 19d and the opposing portions 22a, 22b, 22c and 22d that constitute a part of the inner magnetic poles. The flux of magnetic force thus effectively acts on the magnet 103 that is the rotor. The output of the motor can therefore be increased.

The first inner magnetic poles form a circle that has an outer diameter larger than the inner diameter of the first coil and the second inner magnetic poles form a circle that has an outer diameter larger than the inner diameter of the second coil. Therefore, the distance between the first outer magnetic poles and the first inner magnetic poles, as well as the distance between the second outer magnetic poles and the second inner magnetic poles can be close even when the inner diameter of the coils are reduced to increase the volume of the coils. This makes the magnetic resistance viewed from the coil side small, and hence more flux of magnetic force can be produced with a small electric power. The output of the motor thus can be increased.

FIGS. 13 to 16 are sectional views showing a relation in the motor composed of the first driving device, the second driving device and output means.

The first and second driving devices are arranged such that there is a displacement of 180/n degrees, i.e., 18 degrees between the positional relation of the magnetization phase of the magnet 101 to the outer magnetic poles 18a, 18b, 18c and 18d of the first stator and the positional relation of the magnetization phase of the magnet 103 to the outer magnetic poles 19a, 19b, 19c and 19d of the second stator.

Figure 13:
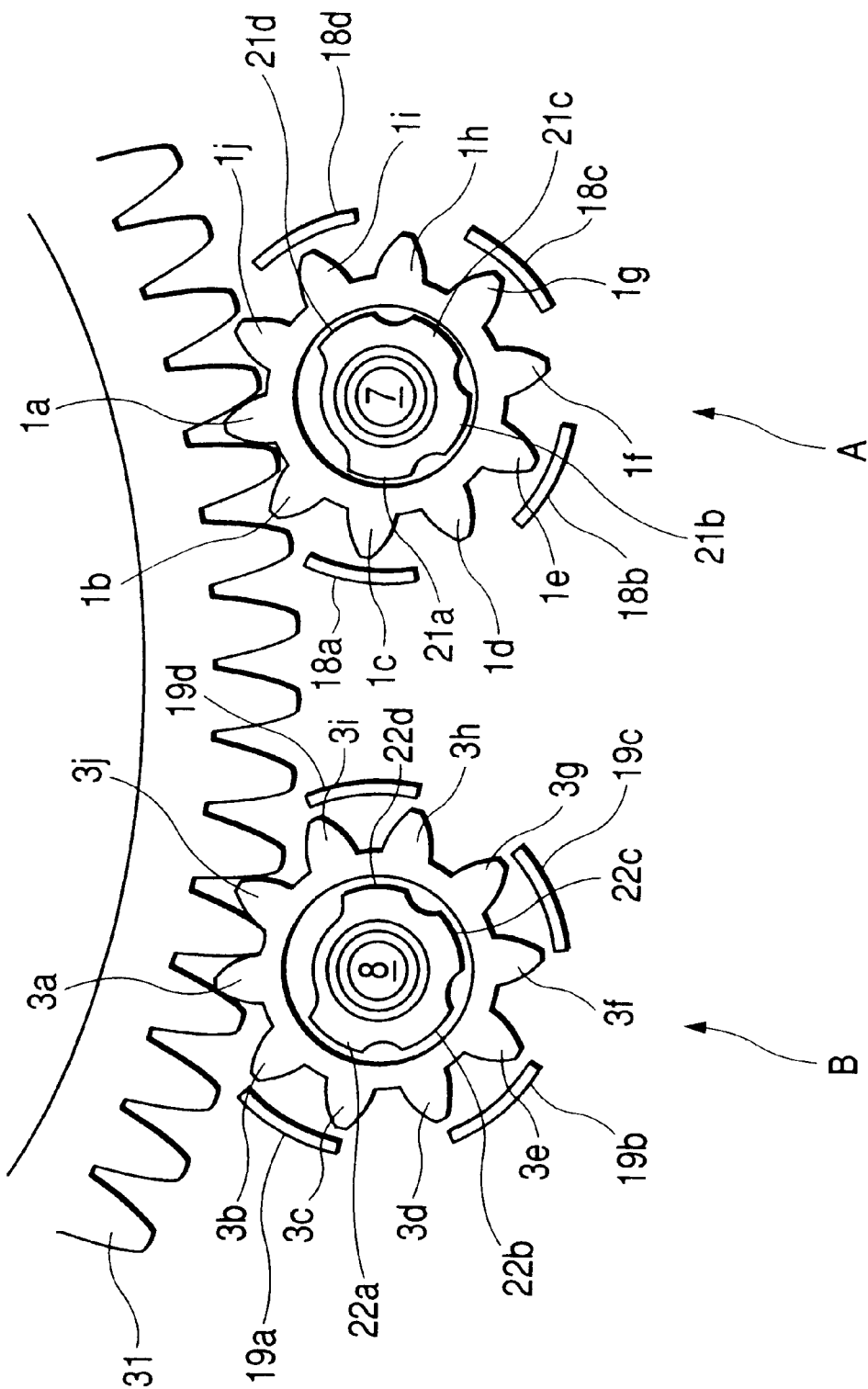
FIG. 13 is a sectional view showing a relation in a motor composed of the first driving device, the second driving device and output means.

The description given next is of the output ring 31 being driven by the first driving device and the second driving device. FIG. 13 illustrates a state in which only the coil 2 is energized for excitation to set the outer magnetic poles 18a, 18b, 18c and 18d of the first stator 18 to the north poles and to set the opposing portions 21a, 21b, 21c and 21d of the first auxiliary yoke (auxiliary stator) 21 which constitute a part of the first inner magnetic poles to the south poles. As a result, the magnetized portions of the magnet 101 which are the south poles are positioned such that each magnetized portion points the center of the respective outer magnetic poles of the first stator 18. In this case, the magnetized portion 1c of the magnet 101 is positioned so as to face the center of the outer magnetic pole 18a of the first stator 18. The magnetized portion 1e of the magnet 101 is positioned so as to face the center of the outer magnetic pole 18b of the first stator 18. The magnetized portion 1g of the magnet 101 is positioned so as to face the center of the outer magnetic pole 18c of the first stator 18. The magnetized portion 1i of the magnet 101 is positioned so as to face the center of the outer magnetic pole 18d of the first stator 18.

The state shown in FIG. 13 is changed by terminating the energization of the coil 2 and energizing the coil 4. The energization of the coil 4 excites the outer magnetic poles 19a, 19b, 19c and 19d of the second stator 19 to set them to the south poles and excites the opposing portions 22a, 22b, 22c and 22d of the second auxiliary yoke (auxiliary stator) 22 which constitute a part of the second inner magnetic poles to set them to the north poles. As a result, the magnetized portions of the magnet 103 which are the north poles are positioned such that each magnetized portion points the center of the respective outer magnetic poles of the second stator 19. In this case, the magnetized portion 3b of the magnet 103 is positioned so as to face the center of the outer magnetic pole 19a of the second stator 19. The magnetized portion 3d of the magnet 103 is positioned so as to face the center of the outer magnetic pole 19b of the second stator 19. The magnetized portion 3f of the magnet 103 is positioned so as to face the center of the outer magnetic pole 19c of the second stator 19. The magnetized portion 3h of the magnet 103 is positioned so as to face the center of the outer magnetic pole 19d of the second stator 19.

The magnet 101 and the magnet 103 coupled to each other by the output ring 31 rotate by 18 degrees counterclockwise. The output ring 31 rotates simultaneously and is moved to the corresponding position to reach the state shown in FIG. 14.

Next, the energization of the coil 4 is terminated and the coil 2 is energized in the direction reverse to the energization direction in FIG. 13.

The excitation sets the outer magnetic poles 18a, 18b, 18c and 18d of the first stator 18 to the south poles and sets the opposing portions 21a, 21b, 21c and 21d of the first auxiliary yoke (auxiliary stator) 21 which constitute a part of the first inner magnetic poles to the north poles. As a result, the magnetized portions of the magnet 101 which are the north poles are positioned such that each magnetized portion points the center of the respective outer magnetic poles of the first stator 18. In this case, the magnetized portion 1b of the magnet 101 is positioned so as to face the center of the outer magnetic pole 18a of the first stator 18. The magnetized portion 1d of the magnet 101 is positioned so as to face the center of the outer magnetic pole 18b of the first stator 18. The magnetized portion 1f of the magnet 101 is positioned so as to face the center of the outer magnetic pole 18c of the first stator 18. The magnetized portion 1h of the magnet 101 is positioned so as to face the center of the outer magnetic pole 18d of the first stator 18.

The magnet 101 and the magnet 103 coupled to each other by the output ring 31 rotate by 18 degrees counterclockwise. The output ring 31 rotates simultaneously and is moved to the corresponding position to reach the state shown in FIG. 15.

Figure 14:
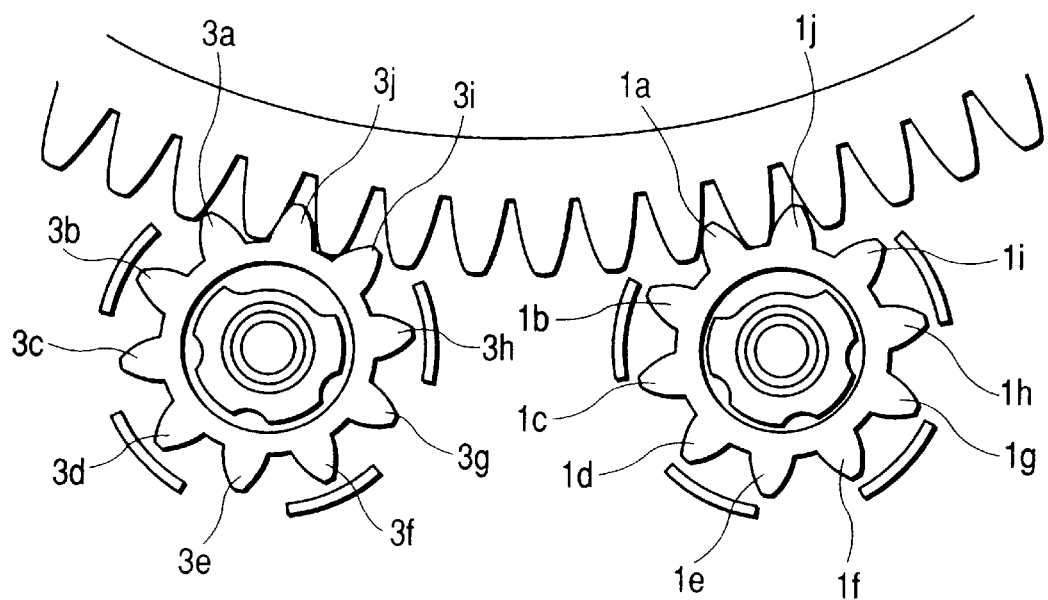
FIG. 14 is a sectional view showing the relation in the motor composed of the first driving device, the second driving device and the output means.
Figure 15:
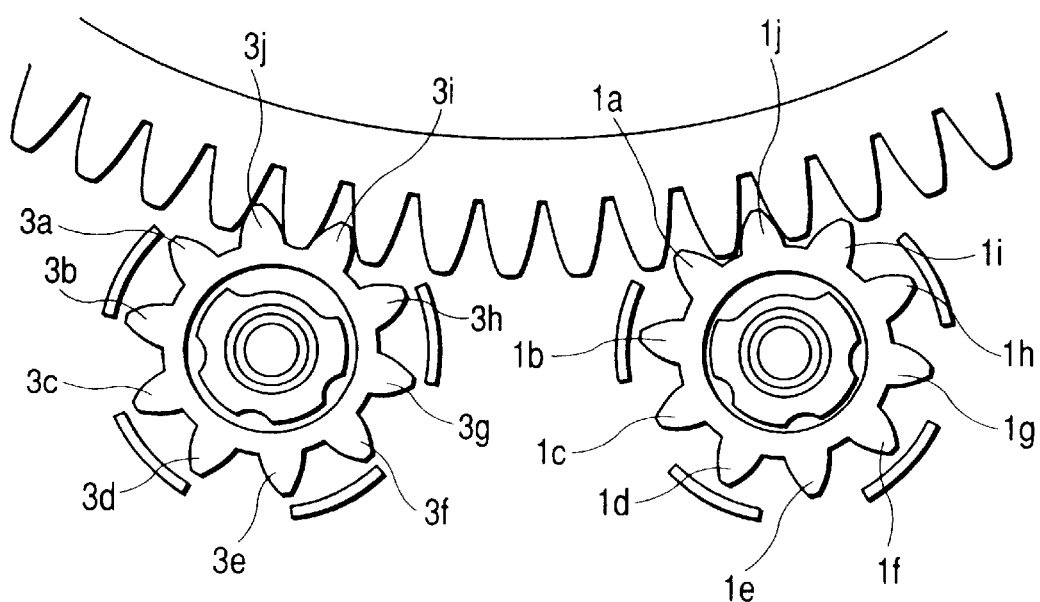
FIG. 15 is a sectional view showing the relation in the motor composed of the first driving device, the second driving device and the output means.
Figure 16:
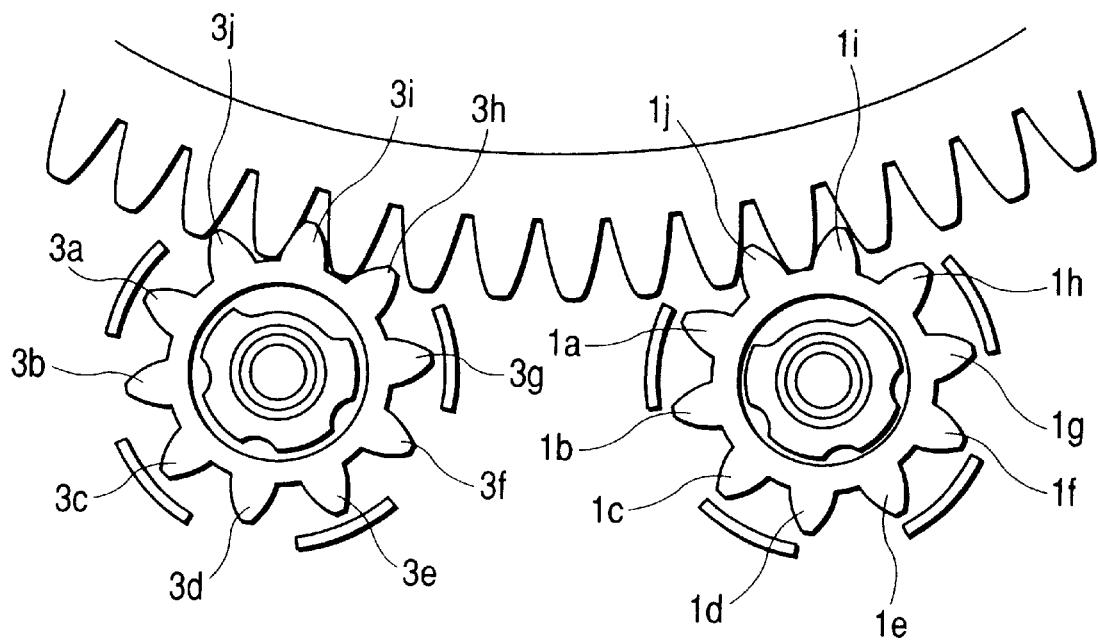
FIG. 16 is a sectional view showing the relation in the motor composed of the first driving device, the second driving device and the output means.

Next, the energization of the coil 2 is terminated and the coil 4 is energized in the direction reverse to the energization direction in FIG. 14.

The excitation sets the outer magnetic poles 19a, 19b, 19c and 19d of the second stator 19 to the north poles and sets the opposing portions 22a, 22b, 22c and 22d of the second auxiliary yoke (auxiliary stator) 22 which constitute a part of the second inner magnetic poles to the south poles. As a result, the magnetized portions of the magnet 103 which are the south poles are positioned such that each magnetized portion points the center of the respective outer magnetic poles of the second stator 19. In this case, the magnetized portion 3a of the magnet 103 is positioned so as to face the center of the outer magnetic pole 19a of the second stator 19. The magnetized portion 3c of the magnet 103 is positioned so as to face the center of the outer magnetic pole 19b of the second stator 19. The magnetized portion 3e of the magnet 103 is positioned so as to face the center of the outer magnetic pole 19c of the second stator 19. The magnetized portion 3g of the magnet 103 is positioned so as to face the center of the outer magnetic pole 19d of the second stator 19.

The magnet 101 and the magnet 103 coupled to each other by the output ring 31 rotate by 18 degrees counterclockwise. The output ring 31 rotates simultaneously and is moved to the corresponding position to reach the state shown in FIG. 16.

In this way, the direction of energization of the coil 2 and the coil 4 is successively switched, whereby the magnet 101, the magnet 103 and the output ring 31 are simultaneously rotated and moved to the position corresponding to the energization phase.

Now, the optimum structure for the thus structured actuator to have a ultra-small size will be described. The basic structure of the actuator includes:

1) shaping the magnet of each of the first driving device and the second driving device into a hollow cylinder;
2) dividing the outer peripheral surface of the magnet of each of the first driving device and the second driving device into n parts along the circumferential direction and magnetizing it so as to form different magnetic poles alternately;
3) placing the coil and the magnet successively in the axial direction of the magnet in each of the first driving device and the second driving device;
4) opposing the outer magnetic poles of the first stator excited by the first coil to the outer peripheral surface of the magnet of the first driving device whereas opposing the inner magnetic poles thereof to the inner peripheral surface of the magnet, and opposing the outer magnetic poles of the second stator excited by the second coil to the outer peripheral surface of the magnet of the second driving device whereas opposing the inner magnetic poles thereof to the inner peripheral surface of the magnet;
5) using a combination of cut-out holes and teeth extending in the direction parallel to the axis as the outer magnetic poles of each of the first driving device and the second driving device;
6) arranging the first driving device and the second driving device in parallel to each other;
7) forming gear portions in the magnets of the first and second driving devices which face the outer magnetic poles and coupling the magnet of the first driving device to the magnet of the second driving device at their gear portions through coupling means;

8) forming teeth of the gear portion of the respective magnets in a number that corresponds to one of integral multiples of the number of magnetic poles of the magnetized portions, and giving the teeth a phase that makes the teeth symmetrical with respect to the center of the respective magnetic poles of the magnetized portions; and 9) forming (N/2−1) outer magnetic poles that face the outer peripheral surface of the respective magnets when the magnets each have N magnetic poles of the magnetized portions, selecting one gap out of the gaps between the outer magnetic poles to set it to a pitch of (360×4/N) degrees, in this embodiment, 144 degrees, and meshing a coupling ring with the gear portions in this gap.

The required diameter for each of the first driving device and the second driving device is equal to the sum of the diameter of the magnet and the thickness of the magnetic poles of the stator which face the peripheral surfaces of the magnet. The required length for each of the first driving device and the second driving device is substantially equal to the sum of the length of their respective magnets and the length of the first or second coil. Therefore the diameter and the length of the magnet and the coil determine the size of the first driving device and the second driving device. When the diameter and the length of the magnet and the coil are very small, ultra-small size first driving device and second driving device can be obtained.

With a very short diameter and a very short length for the magnet and the coil, it is difficult to maintain the precision as the first driving device and the second driving device. However, this problem regarding the precision of the first driving device and the second driving device is solved by a simple structure in which the magnet is formed into a hollow cylinder and the outer magnetic poles of the first (second) stator face the outer peripheral surface of the magnet shaped into a hollow cylinder whereas the inner magnetic poles thereof face the inner peripheral surface of the magnet. If the inner peripheral surface of the magnet is divided along the peripheral surface and magnetized in addition to the outer peripheral surface of the magnet, the output of the motor can be enhanced even more.

The first driving device and the second driving device are arranged such that the opening 30D is not blocked. The diameter of the respective driving devices is thus limited to a minimum, thereby making the diameter of the aperture blade driving device itself small.

The first driving device and the second driving device are arranged side by side so as to be axially parallel to each other, whereby they can constitute an actuator for driving an aperture blade which is short in the direction parallel to the optical axis and which does not form an obstacle to a lens and other components.

As described above, the first and second driving devices have to be arranged such that there is a displacement of 180/n degrees, i.e., 18 degrees between the positional relation of the magnetization phase of the magnet 101 to the outer magnetic poles 18a, 18b, 18c and 18d of the first stator and the positional relation of the magnetization phase of the magnet 103 to the outer magnetic poles 19a, 19b, 19c and 19d of the second stator. The gear portion 1p has teeth in a number equal to the number of magnetic poles of the magnetized portions of the magnet 101, i.e. 10 teeth and the teeth has a phase that makes them symmetrical with respect to the center of the respective magnetic poles of the magnetized portions of the magnet 101. The gear portion 3p has teeth in a number equal to the number of magnetic poles of the magnetized portions of the magnet 103, i.e, 10 teeth and the teeth has a phase that makes them symmetrical with respect to the center of the respective magnetic poles of the magnetized portions of the magnet 103. The magnets thus have balanced magnetization intensity to provide a motor of stable output.

The output ring 31 meshes with the gear portion of the magnet 101 at a position in the wide gap between the magnetic poles 18a and 18d which is wider than the gaps between the other outer magnetic poles of the first stator. The output ring 31 meshes with the gear portion of the magnet 103 at a position in the wide gap between the magnetic poles 19a and 19d which is wider than the gaps between the other outer magnetic poles of the second stator. Therefore, the output ring 31 can be placed in a position that axially overlaps the outer magnetic poles without touching any outer magnetic pole. This helps the motor reducing its axial dimension (namely, a dimension H in FIG. 12).

In this embodiment, the number of magnetic poles of the magnetized portions of the respective magnets is the same as the number of teeth of the respective gear portions, and the teeth are formed to have a phase that makes their points coincide with the center of the respective magnetic poles of the magnets. Therefore, an assembling worker can tell the magnetization phase of the magnets 101 and 103 by looking at the phase of the teeth of the gear portions 1p and 3p, respectively.

Since the magnetization phase of the magnets can be confirmed visually by looking at the position of the teeth of the gear portions, it is easy to set the relative rotational position, through the output means, of the magnet of the first driving device and the magnet of the second driving device to a predetermined position for the assembling. The efficiency in assembling work is therefore improved.

The magnet 101 and the magnet 103 in this embodiment are coupled to each other by the gear of the output ring, by the gear portions each having teeth in a number corresponding to the number of magnetic poles of the magnetized portions. However, the number of teeth of the first gear portion 1p and the second gear portion 3p may not be the same as the number of magnetic poles of the magnetized portions of the magnet 101 and the magnet 103 in the case where facilitating the assembling is not a particularly pursued object. As long as the number of teeth corresponds to one of integral multiples of the number of magnetic poles of the magnetized portions, the teeth can have a phase that makes them symmetrical with respect to the center of the respective magnetic poles of the magnetized portions of the magnets 101 and 103. The magnets thus have balanced magnetization intensity to provide a motor of stable output. FIG. 17 shows the case where the number of teeth is twice the number of magnetic poles of the magnetized portions. In FIG. 17, the center of the respective magnetized portions coincides with the middle between two teeth so that the shape of the magnet is also symmetrical with respect to the center of the respective magnetized portions. Therefore magnetic distribution is also symmetrical with respect to the center of the respective magnetized portions.

In this embodiment, the motor composed of the first driving device, the second driving device and the output ring that is the output means is used as an actuator for driving an aperture blade. However, the motor is also useful in other applications as a motor that is advantageous in its high output, small diameter and short axial length. For example, the motor can be used to rotate a cam barrel for driving a lens.

As detailed in the above, the drive transmission device comprises:

a first driving device comprised of:

a magnet having a gear portion at least on its outer peripheral surface, the gear portion being divided along the circumferential direction and magnetized to form different magnetic poles alternately, the magnet being rotatable about a rotation axis;

a coil arranged in the axial direction of the magnet; and a stator having outer magnetic poles and inner magnetic poles that are excited by the coil, the outer magnetic poles facing the outer peripheral surface of the magnet whereas the inner magnetic poles facing the inner peripheral surface of the magnet;

a second driving device comprised of:

a magnet having a gear portion at least on its outer peripheral surface, the gear portion being divided along the circumferential direction and magnetized to form different magnetic poles alternately, the magnet being rotatable about a rotation axis;

a coil arranged in the axial direction of the magnet; and a stator having outer magnetic poles and inner magnetic poles that are excited by the coil, the outer magnetic poles facing the outer peripheral surface of the magnet whereas the inner magnetic poles facing the inner peripheral surface of the magnet; and output means having a gear portion that is meshed with the gear portion of the magnet of the first driving device and the gear portion of the magnet of the second driving device, wherein the first driving device and the second driving device are arranged so as to be axially parallel to each other.

Therefore the present invention can provide a drive transmission device which can rotate bidirectionally, which is short in the axial direction, and which has high output.

The number of teeth of the gear portion formed in the respective magnets of the first driving device and the second driving device corresponds to one of integral multiples of the number of magnetic poles of the magnetized portions. The teeth has a phase that makes them symmetrical with respect to the center of the respective magnetic poles of the magnetized portions. The magnetization intensity distribution is thus symmetrical with respect to the center of the respective magnetic poles of the magnetized portions of the magnets. This makes the magnetized portions balanced and gives the drive transmission device a stable output.

(N/2−1) outer magnetic poles that face the outer peripheral surface of the respective magnets are formed when the magnets each have N magnetic poles of the magnetized portions. In this case, (N/2−1) gaps between the outer magnetic poles are each set to a pitch of (2×360/N) degrees whereas one gap between the outer magnetic poles is set to a pitch of 360/N degrees. In the gap having a relatively wide pitch of 360/N degrees, coupling means couples the gear portion of the magnet of the first driving device to the gear portion of the magnet of the second driving device. The coupling means thus can be arranged in a position axially overlapping the outer magnetic poles, thereby reducing the axial dimension of the drive transmission device.

The aperture blade driving mechanism comprises the motor described above, is capable of rotating about the principal axis to open and close the aperture blade by the rotation, and is driven by the output means coupled to the magnet of the first driving device and the magnet of the second driving device. Therefore, the mechanism can form an aperture blade driving device which is provided with a high-power, inexpensive, small-sized motor. The device can serve as an actuator for driving an aperture blade which is short in the direction parallel to the optical axis and which does not form an obstacle to a lens and other components.

What is claimed is:

1. A motor device comprising:

a first motor unit comprised of:
(a) a first rotary magnet that is cylindrical and magnetized so as to have different magnetic poles in turn along the circumferential direction;
(b) a first rotary gear having a plurality of teeth, said rotary gear rotating about the rotation axis of said first rotary magnet together with said first rotary magnet; and
(c) a stator member having a plurality of outer magnetic poles that are arranged on the outer periphery of said first rotary magnet and a plurality of inner magnetic poles that are arranged on the inner periphery of said first rotary magnet and are opposed to said outer magnetic poles, said plurality of outer magnetic poles and said plurality of inner magnetic poles being excited by a first coil;

a second motor unit comprised of:
(d) a second rotary magnet that is cylindrical and magnetized so as to have different magnetic poles in turn along the circumferential direction;
(e) a second rotary gear having a plurality of teeth, said rotary gear rotating about the rotation axis of said second rotary magnet together with said second rotary magnet; and
(f) a stator member having a plurality of outer magnetic poles that are arranged on the outer periphery of said second rotary magnet and a plurality of inner magnetic poles that are arranged on the inner periphery of said second rotary magnet and are opposed to said outer magnetic poles, said plurality of outer magnetic poles and said plurality of inner magnetic poles being excited by a second coil; and a driven member meshed with said first rotary gear and said second rotary gear, wherein electric power having different phases are supplied to said first and second coils to rotate said first rotary gear and said second rotary gear, which then drive said driven member.

2. A motor device according to claim 1, wherein the number of teeth of said first rotary gear is equal to the number of magnetic poles of said first rotary magnet, and the number of teeth of said second rotary gear is equal to the number of magnetic poles of said second rotary magnet.

3. A motor device according to claim 2, wherein the number of magnetic poles of said first rotary magnet is equal to the number of magnetic poles of said second rotary magnet.

4. A motor device according to claim 1, wherein said first and second motor units are arranged side by side so that their rotation axes are in parallel with each other.

5. A motor device according to claim 1, wherein the number of said plurality of outer magnetic poles is half the number of magnetic poles of the respective rotary magnets.

6. A motor device according to claim 1, further comprising an aperture blade that is put in motion by driving said driven member.

7. A motor device according to claim 1, wherein said first rotary gear is formed in said first rotary magnet, and said second rotary gear is formed in said second rotary magnet.

8. A motor device comprising:

a first motor unit comprised of:
(a) a first rotary magnet that is cylindrical and magnetized so as to have different magnetic poles in turn along the circumferential direction, said first rotary magnet having a first gear portion that is formed therein and has a plurality of teeth; and (b) a stator member having a plurality of outer magnetic poles that are arranged on the outer periphery of said first rotary magnet and a plurality of inner magnetic poles that are arranged on the inner periphery of said first rotary magnet and are opposed to said outer magnetic poles, said plurality of outer magnetic poles and said plurality of inner magnetic poles being excited by a first coil;

a second motor unit comprised of:

(c) a second rotary magnet that is cylindrical and magnetized so as to have different magnetic poles in turn along the circumferential direction, said second rotary magnet having a second gear portion that is formed therein and has a plurality of teeth; and (d) a stator member having a plurality of outer magnetic poles that are arranged on the outer periphery of said second rotary magnet and a plurality of inner magnetic poles that are arranged on the inner periphery of said second rotary magnet and are opposed to said outer magnetic poles, said plurality of outer magnetic poles and said plurality of inner magnetic poles being excited by a second coil; and a driven member meshed with said first gear portion and said second gear portion, wherein electric power having different phases are supplied to said first and second coils to rotate said first gear portion and said second gear portion, which then drive said driven member.

9. A motor device according to claim 8, wherein the number of teeth of said first gear portion is equal to the number of magnetic poles of said first rotary magnet, and the number of teeth of said second gear portion is equal to the number of magnetic poles of said second rotary magnet.

10. A motor device according to claim 9, wherein the number of magnetic poles of said first rotary magnet is equal to the number of magnetic poles of said second rotary magnet.

11. A motor device according to claim 8, wherein said first and second motor units are arranged side by side so that their rotation axes are in parallel with each other.

12. A motor device according to claim 8, further comprising an aperture blade that is put in motion by driving said driven member.

* * * * *